(12) United States Patent
Keane et al.

(10) Patent No.: US 7,933,835 B2
(45) Date of Patent: Apr. 26, 2011

(54) SECURE MONEY TRANSFER SYSTEMS AND METHODS USING BIOMETRIC KEYS ASSOCIATED THEREWITH

(75) Inventors: Tim Keane, Dublin (IE); Dean Seifert, Dublin (IE); Jonathan Grahmann, Dublin (IE)

(73) Assignee: The Western Union Company, Englewood, CO (US)

( * ) Notice: Subject to any disclaimer, the term of this patent is extended or adjusted under 35 U.S.C. 154(b) by 682 days.

(21) Appl. No.: 11/623,968

(22) Filed: Jan. 17, 2007

(65) Prior Publication Data
US 2008/0172342 A1 Jul. 17, 2008

(51) Int. Cl.
*G06F 1/00* (2006.01)
*H04L 29/06* (2006.01)
(52) U.S. Cl. .............................. 705/43; 235/379; 705/79
(58) Field of Classification Search ................... 705/64, 705/57, 43, 75
See application file for complete search history.

(56) References Cited

U.S. PATENT DOCUMENTS

| | | |
|---|---|---|
| 1,109,127 A | 9/1914 | Juengst |
| 2,362,134 A | 11/1944 | Hoing |
| 3,599,151 A | 8/1971 | Harr |
| 3,717,337 A | 2/1973 | McCain et al. |
| 3,783,755 A | 1/1974 | Lagin |
| 3,833,395 A | 9/1974 | Gosnell |
| 4,007,355 A | 2/1977 | Moreno |
| 4,032,931 A | 6/1977 | Haker |
| 4,060,228 A | 11/1977 | Tress et al. |
| 4,256,955 A | 3/1981 | Giraud et al. |
| 4,321,672 A | 3/1982 | Braun et al. |
| 4,385,285 A | 5/1983 | Horst et al. |
| 4,454,414 A | 6/1984 | Benton |
| 4,462,585 A | 7/1984 | Gieson et al. |
| 4,511,132 A | 4/1985 | Muller |
| 4,527,793 A | 7/1985 | Bottcher et al. |
| 4,528,643 A | 7/1985 | Freeny, Jr. |
| 4,562,340 A | 12/1985 | Tateisi et al. |
| 4,562,341 A | 12/1985 | Ohmae et al. |

(Continued)

FOREIGN PATENT DOCUMENTS

AU 763008 B2 1/2001
(Continued)

OTHER PUBLICATIONS

U.S. Appl. No. 10/047,917, filed Jan. 14, 2002, Kroon.
(Continued)

*Primary Examiner* — Evens J Augustin
(74) *Attorney, Agent, or Firm* — Kilpatrick Townsend & Stockton LLP

(57) ABSTRACT

A method for transferring funds from a sender to a recipient includes receiving a request to transfer the funds from a sender; creating a transaction record having a transaction identifier; providing the transaction identifier to the sender; receiving the transaction identifier from a recipient; obtaining a first biometric sample from the recipient; using the biometric sample to select a MTCN (Money Transfer Control Number) from a pool of predetermined MTCNs; associating the MTCN with the first biometric sample and the transaction record; providing the MTCN to the recipient; thereafter, receiving a request from the recipient to receive the funds; obtaining the MTCN from the recipient; obtaining a second biometric sample from the recipient; using the MTCN and/or the second biometric sample to locate the transaction record; comparing the second biometric sample to the first biometric sample; and determining whether to provide the funds based on the comparison.

18 Claims, 16 Drawing Sheets

U.S. PATENT DOCUMENTS

| | | |
|---|---|---|
| 4,577,848 A | 3/1986 | Hams |
| 4,594,663 A | 6/1986 | Nagata et al. |
| 4,630,200 A | 12/1986 | Ohmae et al. |
| 4,634,107 A | 1/1987 | Vandersyde et al. |
| 4,650,977 A | 3/1987 | Couch |
| 4,678,895 A | 7/1987 | Tateisi et al. |
| 4,697,246 A | 9/1987 | Zemke et al. |
| 4,700,055 A | 10/1987 | Kashkashian, Jr. |
| 4,718,657 A | 1/1988 | Otter et al. |
| 4,722,554 A | 2/1988 | Pettit |
| 4,723,212 A | 2/1988 | Mindrum et al. |
| 4,753,430 A | 6/1988 | Rowe et al. |
| 4,764,666 A | 8/1988 | Bergeron |
| 4,795,892 A | 1/1989 | Gilmore et al. |
| 4,812,628 A | 3/1989 | Boston et al. |
| 4,837,422 A | 6/1989 | Dethloff et al. |
| 4,864,618 A | 9/1989 | Wright et al. |
| 4,884,212 A | 11/1989 | Stutsman |
| 4,900,903 A | 2/1990 | Wright et al. |
| 4,902,881 A | 2/1990 | Janku |
| 4,910,672 A | 3/1990 | Off et al. |
| 4,941,090 A | 7/1990 | McCarthy |
| 4,961,142 A | 10/1990 | Elliott et al. |
| 4,972,318 A | 11/1990 | Brown et al. |
| 5,021,967 A | 6/1991 | Smith |
| 5,025,372 A | 6/1991 | Burton et al. |
| 5,027,316 A | 6/1991 | Frantz et al. |
| 5,029,208 A | 7/1991 | Tanaka |
| 5,053,607 A | 10/1991 | Carlson et al. |
| 5,056,019 A | 10/1991 | Schultz et al. |
| 5,082,268 A | 1/1992 | Santoro |
| 5,119,293 A | 1/1992 | Hammond |
| 5,088,711 A | 2/1992 | Newsome |
| 5,117,355 A | 5/1992 | McCarthy |
| 5,146,067 A | 9/1992 | Sloan et al. |
| 5,155,342 A | 10/1992 | Urano |
| 5,171,005 A | 12/1992 | Manley et al. |
| 5,173,851 A | 12/1992 | Off et al. |
| 5,175,682 A | 12/1992 | Higashiyama et al. |
| 5,185,695 A | 2/1993 | Pruchnicki |
| 5,200,889 A | 4/1993 | Mori |
| 5,202,826 A | 4/1993 | McCarthy |
| 5,216,229 A | 6/1993 | Copella et al. |
| 5,220,501 A | 6/1993 | Lawlor et al. |
| 5,231,569 A | 7/1993 | Myatt et al. |
| 5,233,167 A | 8/1993 | Markman et al. |
| 5,236,960 A | 8/1993 | Harrison et al. |
| 5,245,329 A * | 9/1993 | Gokcebay ............. 340/5.33 |
| 5,250,906 A | 10/1993 | Bills et al. |
| 5,255,182 A | 10/1993 | Adams |
| 5,283,829 A | 2/1994 | Anderson |
| 5,305,196 A | 4/1994 | Deaton et al. |
| 5,317,135 A | 5/1994 | Finocchio |
| 5,326,960 A | 7/1994 | Tannenbaum |
| 5,327,701 A | 7/1994 | Dronsfield |
| 5,334,823 A | 8/1994 | Noblett |
| 5,350,906 A | 9/1994 | Brody et al. |
| 5,352,876 A | 10/1994 | Watanabe et al. |
| 5,357,563 A | 10/1994 | Hamilton et al. |
| 5,367,452 A | 11/1994 | Gallery et al. |
| 5,371,798 A | 12/1994 | McWhortor |
| 5,386,458 A | 1/1995 | Nair et al. |
| 5,388,815 A | 2/1995 | Hill et al. |
| RE34,915 E | 4/1995 | Nichtberger et al. |
| 5,404,000 A | 4/1995 | Nair et al. |
| 5,408,077 A | 4/1995 | Campo et al. |
| 5,426,594 A | 6/1995 | Wright et al. |
| 5,428,210 A | 6/1995 | Nair et al. |
| 5,432,326 A | 7/1995 | Noblett, Jr. et al. |
| 5,432,506 A | 7/1995 | Chapman |
| 5,440,108 A | 8/1995 | Tran et al. |
| 5,448,043 A | 9/1995 | Nakano et al. |
| 5,448,471 A | 9/1995 | Deaton et al. |
| 5,461,217 A | 10/1995 | Claus |
| 5,464,971 A | 11/1995 | Sutcliffe et al. |
| 5,465,206 A | 11/1995 | Hilt et al. |
| 5,470,427 A | 11/1995 | Mikel et al. |
| 5,471,669 A | 11/1995 | Lidman |
| 5,475,603 A | 12/1995 | Korowotny |
| 5,477,037 A | 12/1995 | Berger |
| 5,477,038 A | 12/1995 | Levine et al. |
| 5,479,530 A | 12/1995 | Nair et al. |
| 5,483,444 A | 1/1996 | Heintzeman et al. |
| 5,483,445 A | 1/1996 | Pickering |
| 5,484,988 A | 1/1996 | Hills et al. |
| 5,491,325 A | 2/1996 | Huang et al. |
| 5,500,513 A | 3/1996 | Langhans et al. |
| 5,502,766 A | 3/1996 | Boebert et al. |
| 5,504,677 A | 4/1996 | Pollin |
| 5,504,808 A | 4/1996 | Hamrick, Jr. |
| 5,510,979 A | 4/1996 | Moderi et al. |
| 5,511,114 A | 4/1996 | Stimson |
| 5,513,102 A | 4/1996 | Auriemma |
| 5,513,117 A | 4/1996 | Small |
| 5,524,073 A | 6/1996 | Stambler |
| 5,530,232 A | 6/1996 | Taylor |
| 5,534,855 A * | 7/1996 | Shockley et al. ............ 340/5.52 |
| 5,537,314 A | 7/1996 | Kanter |
| 5,546,523 A | 8/1996 | Gatto |
| 5,550,734 A | 8/1996 | Tarter et al. |
| 5,555,496 A | 9/1996 | Tackbary et al. |
| 5,557,516 A | 9/1996 | Hogan |
| 5,570,465 A | 10/1996 | Tsakanikas |
| 5,577,109 A | 11/1996 | Stimson et al. |
| 5,578,808 A | 11/1996 | Taylor |
| 5,586,036 A | 12/1996 | Pintsov |
| 5,590,038 A | 12/1996 | Pritod |
| 5,592,400 A | 1/1997 | Sasou |
| 5,604,802 A | 2/1997 | Holloway |
| 5,612,868 A | 3/1997 | Off et al. |
| 5,613,012 A | 3/1997 | Hoffman et al. |
| 5,614,703 A | 3/1997 | Martin et al. |
| 5,621,640 A | 4/1997 | Burke |
| 5,622,388 A | 4/1997 | Alcordo |
| 5,627,909 A | 5/1997 | Blaylock et al. |
| 5,629,982 A | 5/1997 | Micali |
| 5,637,845 A | 6/1997 | Kolls |
| 5,638,283 A | 6/1997 | Herbert |
| 5,642,485 A | 6/1997 | Deaton et al. |
| 5,644,723 A | 7/1997 | Deaton et al. |
| 5,647,583 A | 7/1997 | Emigh et al. |
| 5,649,114 A | 7/1997 | Deaton et al. |
| 5,649,117 A | 7/1997 | Landry |
| 5,650,604 A | 7/1997 | Marcous et al. |
| 5,657,201 A | 8/1997 | Kochis |
| 5,659,469 A | 8/1997 | Deaton et al. |
| 5,666,765 A | 9/1997 | Sarner et al. |
| 5,668,897 A | 9/1997 | Stolfo |
| 5,671,279 A | 9/1997 | Elgamal |
| 5,673,320 A | 9/1997 | Ray et al. |
| 5,677,955 A | 10/1997 | Doggett et al. |
| 5,678,010 A | 10/1997 | Pittenger et al. |
| 5,679,940 A | 10/1997 | Templeton et al. |
| 5,684,965 A | 11/1997 | Pickering |
| 5,686,713 A | 11/1997 | Rivera |
| 5,687,322 A | 11/1997 | Deaton et al. |
| 5,689,100 A | 11/1997 | Carrithers et al. |
| 5,699,528 A | 12/1997 | Hogan |
| 5,717,868 A | 2/1998 | James |
| 5,721,768 A | 2/1998 | Stimson et al. |
| 5,722,221 A | 3/1998 | Maltman et al. |
| 5,732,136 A | 3/1998 | Murphree et al. |
| 5,732,400 A | 3/1998 | Mandler et al. |
| 5,734,838 A | 3/1998 | Robinson et al. |
| 5,745,886 A | 4/1998 | Rosen |
| 5,754,654 A | 5/1998 | Hiroya et al. |
| 5,757,917 A | 5/1998 | Rose et al. |
| 5,760,381 A | 6/1998 | Stich et al. |
| 5,761,648 A | 6/1998 | Golden et al. |
| 5,764,789 A | 6/1998 | Pare et al. |
| 5,764,888 A | 6/1998 | Bolan et al. |
| 5,770,843 A | 6/1998 | Rose et al. |
| 5,774,870 A | 6/1998 | Storey |
| 5,774,879 A | 6/1998 | Custy et al. |
| 5,778,067 A | 7/1998 | Jones et al. |
| 5,779,379 A | 7/1998 | Mason et al. |
| 5,783,808 A | 7/1998 | Josephson |

| | | | | | |
|---|---|---|---|---|---|
| 5,787,403 A | 7/1998 | Randle | 5,969,318 A | 10/1999 | Mackenthun |
| 5,790,677 A | 8/1998 | Fox et al. | 5,970,480 A | 10/1999 | Kalina |
| 5,794,207 A | 8/1998 | Walker et al. | 5,974,146 A | 10/1999 | Randle et al. |
| 5,796,832 A | 8/1998 | Kawan | 5,974,148 A | 10/1999 | Stambler |
| 5,799,072 A | 8/1998 | Vulcan et al. | 5,974,194 A | 10/1999 | Hirani et al. |
| 5,801,365 A | 9/1998 | Katz | 5,974,399 A | 10/1999 | Giuliani et al. |
| 5,804,806 A | 9/1998 | Haddad et al. | RE36,365 E | 11/1999 | Levine et al. |
| 5,805,719 A | 9/1998 | Pare et al. | 5,975,514 A | 11/1999 | Emigh et al. |
| 5,806,045 A | 9/1998 | Biorge et al. | 5,978,780 A | 11/1999 | Watson |
| 5,812,668 A | 9/1998 | Weber | 5,983,003 A | 11/1999 | Lection et al. |
| 5,815,555 A * | 9/1998 | Cairo ..................... 379/93.07 | 5,983,196 A | 11/1999 | Wendkos |
| 5,815,657 A | 9/1998 | Williams et al. | 5,983,208 A | 11/1999 | Haller et al. |
| 5,825,617 A | 10/1998 | Kochis et al. | 5,984,181 A | 11/1999 | Kreft |
| 5,825,881 A | 10/1998 | Colvin, Sr. | 5,987,132 A | 11/1999 | Rowney |
| 5,826,241 A | 10/1998 | Stein et al. | 5,987,140 A | 11/1999 | Rowney et al. |
| 5,826,243 A | 10/1998 | Musmanno et al. | 5,987,426 A | 11/1999 | Goodwin, III |
| 5,828,875 A | 10/1998 | Halvarsson et al. | 5,987,429 A | 11/1999 | Maritzen et al. |
| 5,832,457 A | 11/1998 | O'Brien et al. | 5,987,438 A | 11/1999 | Nakano et al. |
| 5,832,463 A | 11/1998 | Funk | 5,991,376 A | 11/1999 | Hennessy et al. |
| 5,850,446 A | 12/1998 | Berger et al. | 5,991,413 A | 11/1999 | Arditti et al. |
| 5,855,007 A | 12/1998 | Jovicic et al. | 5,991,748 A | 11/1999 | Taskett |
| 5,859,419 A | 1/1999 | Wynn | 5,991,749 A | 11/1999 | Morrill, Jr. |
| 5,864,830 A | 1/1999 | Armetta et al. | 5,991,750 A | 11/1999 | Watson |
| RE36,116 E | 2/1999 | McCarthy | 5,993,047 A | 11/1999 | Novogrod et al. |
| 5,865,470 A | 2/1999 | Thompson | 5,995,976 A | 11/1999 | Walker et al. |
| 5,868,236 A | 2/1999 | Rademacher | 5,999,596 A | 12/1999 | Walker et al. |
| 5,870,718 A | 2/1999 | Spector | 5,999,624 A | 12/1999 | Hopkins |
| 5,870,723 A * | 2/1999 | Pare et al. ..................... 705/39 | 5,999,625 A | 12/1999 | Bellare et al. |
| 5,873,072 A | 2/1999 | Kight et al. | 6,000,522 A | 12/1999 | Johnson |
| 5,875,435 A | 2/1999 | Brown | 6,000,608 A | 12/1999 | Dorf |
| 5,878,211 A | 3/1999 | Delagrange et al. | 6,000,832 A | 12/1999 | Franklin et al. |
| 5,880,446 A | 3/1999 | Mori et al. | 6,002,767 A | 12/1999 | Kramer |
| 5,889,863 A | 3/1999 | Weber | 6,002,771 A | 12/1999 | Nielsen |
| 5,893,080 A | 4/1999 | McGurl et al. | 6,003,763 A | 12/1999 | Gallagher et al. |
| 5,896,298 A | 4/1999 | Richter | 6,006,988 A | 12/1999 | Behrmann et al. |
| 5,896,725 A | 4/1999 | Lundstrom et al. | 6,009,411 A | 12/1999 | Kepecs |
| 5,897,625 A | 4/1999 | Gustin et al. | 6,009,412 A | 12/1999 | Storey |
| 5,897,989 A | 4/1999 | Beecham | 6,009,415 A | 12/1999 | Shurling et al. |
| 5,898,154 A | 4/1999 | Rosen | 6,011,833 A | 1/2000 | West |
| 5,899,980 A | 5/1999 | Wilf et al. | 6,012,045 A | 1/2000 | Barzilai et al. |
| 5,899,982 A | 5/1999 | Randle | 6,012,048 A | 1/2000 | Gustin et al. |
| 5,902,983 A | 5/1999 | Crevelt et al. | 6,012,635 A | 1/2000 | Shimada et al. |
| 5,903,633 A | 5/1999 | Lorsch | 6,015,087 A | 1/2000 | Seifert et al. |
| 5,903,721 A | 5/1999 | Sixtus | 6,021,202 A | 2/2000 | Anderson et al. |
| 5,903,880 A | 5/1999 | Biffar | 6,021,491 A | 2/2000 | Renaud |
| 5,903,881 A | 5/1999 | Schrader et al. | 6,021,943 A | 2/2000 | Chastain |
| 5,909,486 A | 6/1999 | Walker et al. | 6,024,288 A | 2/2000 | Gottlich et al. |
| 5,909,492 A | 6/1999 | Payne et al. | 6,026,370 A | 2/2000 | Jermyn |
| 5,909,673 A | 6/1999 | Gregory | 6,026,379 A | 2/2000 | Haller et al. |
| 5,910,988 A | 6/1999 | Ballard | 6,027,216 A | 2/2000 | Guyton |
| 5,912,974 A | 6/1999 | Holloway et al. | 6,029,150 A | 2/2000 | Kravitz |
| 5,913,202 A | 6/1999 | Motoyama | 6,029,888 A | 2/2000 | Harvey |
| 5,914,472 A | 6/1999 | Foladare et al. | 6,030,000 A | 2/2000 | Diamond |
| 5,915,007 A | 6/1999 | Klapka | 6,032,133 A | 2/2000 | Hilt et al. |
| 5,915,023 A | 6/1999 | Bernstein | 6,032,136 A | 2/2000 | Brake, Jr. et al. |
| 5,915,024 A | 6/1999 | Kitaori et al. | 6,032,137 A | 2/2000 | Ballard |
| 5,918,909 A | 7/1999 | Fiala et al. | 6,035,285 A | 3/2000 | Schlect et al. |
| 5,920,628 A | 7/1999 | Indeck et al. | 6,035,406 A | 3/2000 | Moussa et al. |
| 5,920,629 A | 7/1999 | Rosen | 6,039,245 A | 3/2000 | Symonds et al. |
| 5,920,847 A | 7/1999 | Kolling et al. | 6,039,250 A | 3/2000 | Ito et al. |
| 5,920,848 A | 7/1999 | Schutzer et al. | 6,044,360 A | 3/2000 | Picciallo |
| 5,923,016 A | 7/1999 | Fredregill et al. | 6,044,362 A | 3/2000 | Neely |
| 5,924,080 A | 7/1999 | Johnson | 6,045,039 A | 4/2000 | Stinson et al. |
| 5,926,795 A | 7/1999 | Williams | 6,047,268 A | 4/2000 | Bartoli et al. |
| 5,936,221 A | 8/1999 | Corder et al. | 6,049,782 A | 4/2000 | Gottesman et al. |
| 5,937,396 A | 8/1999 | Konya | 6,052,674 A | 4/2000 | Zervides et al. |
| 5,940,811 A | 8/1999 | Norris | 6,058,417 A | 5/2000 | Hess et al. |
| 5,943,424 A | 8/1999 | Berger et al. | 6,061,660 A | 5/2000 | Eggleston et al. |
| 5,943,656 A | 8/1999 | Crooks et al. | 6,061,665 A | 5/2000 | Bahreman |
| 5,949,044 A | 9/1999 | Walker et al. | 6,061,794 A | 5/2000 | Angelo et al. |
| 5,949,885 A | 9/1999 | Leighton | 6,061,799 A | 5/2000 | Eldridge et al. |
| 5,950,179 A | 9/1999 | Buchanan et al. | 6,064,990 A | 5/2000 | Goldsmith |
| 5,952,639 A | 9/1999 | Ohki et al. | 6,068,183 A | 5/2000 | Freeman et al. |
| 5,953,709 A | 9/1999 | Gilbert et al. | 6,070,147 A | 5/2000 | Harms et al. |
| 5,953,710 A | 9/1999 | Fleming | 6,070,150 A | 5/2000 | Remington et al. |
| 5,956,700 A | 9/1999 | Landry | 6,070,154 A | 5/2000 | Tavor et al. |
| 5,960,412 A | 9/1999 | Tackbary et al. | 6,070,156 A | 5/2000 | Hartsell et al. |
| 5,960,963 A | 10/1999 | Chodack et al. | 6,070,798 A | 6/2000 | Nethery |
| 5,963,647 A | 10/1999 | Downing et al. | 6,072,870 A | 6/2000 | Nguyen et al. |

| | | | | | | |
|---|---|---|---|---|---|---|
| 6,073,121 | A | 6/2000 | Ramzy | 6,286,756 | B1 | 9/2001 | Stinson et al. |
| 6,078,907 | A | 6/2000 | Lamm | 6,289,322 | B1 | 9/2001 | Kitchen et al. |
| 6,081,790 | A | 6/2000 | Rosen | 6,292,786 | B1 | 9/2001 | Deaton et al. |
| 6,088,683 | A | 7/2000 | Jalili | 6,292,789 | B1 | 9/2001 | Schutzer |
| 6,088,684 | A | 7/2000 | Custy et al. | 6,295,522 | B1 | 9/2001 | Boesch |
| 6,092,202 | A * | 7/2000 | Veil et al. ................... 726/27 | 6,298,335 | B1 | 10/2001 | Bernstein |
| 6,094,894 | A | 8/2000 | Yates | 6,298,336 | B1 | 10/2001 | Davis et al. |
| 6,097,834 | A | 8/2000 | Krouse et al. | 6,304,860 | B1 | 10/2001 | Martin, Jr. et al. |
| 6,098,053 | A | 8/2000 | Slater | 6,304,915 | B1 | 10/2001 | Nguyen et al. |
| 6,102,287 | A | 8/2000 | Matyas, Jr. | 6,305,604 | B1 | 10/2001 | Ono |
| 6,104,815 | A | 8/2000 | Alcorn et al. | 6,308,887 | B1 | 10/2001 | Korman et al. |
| 6,105,009 | A | 8/2000 | Cuervo | 6,311,170 | B1 | 10/2001 | Embrey |
| 6,106,020 | A | 8/2000 | Leef et al. | 6,314,169 | B1 | 11/2001 | Schelberg, Jr. et al. |
| 6,108,641 | A | 8/2000 | Kenna et al. | 6,314,519 | B1 | 11/2001 | Davis et al. |
| 6,111,953 | A | 8/2000 | Walker et al. | 6,315,195 | B1 | 11/2001 | Ramachandran |
| 6,119,105 | A | 9/2000 | Williams | 6,317,745 | B1 | 11/2001 | Thomas et al. |
| 6,119,106 | A | 9/2000 | Mersky et al. | 6,321,210 | B1 | 11/2001 | O'Brein et al. |
| 6,119,931 | A | 9/2000 | Novogrod | 6,321,211 | B1 | 11/2001 | Dodd |
| 6,119,933 | A | 9/2000 | Wong et al. | 6,321,984 | B1 | 11/2001 | McCall et al. |
| 6,122,624 | A | 9/2000 | Tetro et al. | 6,321,987 | B1 | 11/2001 | Watanabe et al. |
| 6,122,625 | A | 9/2000 | Rosen | 6,324,525 | B1 | 11/2001 | Kramer et al. |
| 6,128,599 | A | 10/2000 | Walker et al. | 6,327,348 | B1 | 12/2001 | Walker et al. |
| 6,128,602 | A | 10/2000 | Northington et al. | 6,327,570 | B1 | 12/2001 | Stevens |
| 6,128,603 | A | 10/2000 | Dent et al. | 6,327,575 | B1 | 12/2001 | Katz |
| 6,129,275 | A | 10/2000 | Urquhart et al. | 6,330,544 | B1 | 12/2001 | Walker et al. |
| 6,134,561 | A | 10/2000 | Brandien et al. | 6,330,546 | B1 | 12/2001 | Gopinathan et al. |
| 6,135,292 | A | 10/2000 | Pettner | 6,334,108 | B1 | 12/2001 | Deaton et al. |
| 6,138,911 | A | 10/2000 | Fredregill et al. | 6,334,109 | B1 * | 12/2001 | Kanevsky et al. ......... 705/14.67 |
| 6,145,738 | A | 11/2000 | Stinson et al. | 6,335,688 | B1 * | 1/2002 | Sweatte ..................... 340/573.1 |
| 6,145,740 | A | 11/2000 | Molano et al. | 6,336,099 | B1 | 1/2002 | Barnett et al. |
| 6,148,377 | A | 11/2000 | Carter et al. | 6,343,279 | B1 | 1/2002 | Bissonette et al. |
| 6,149,055 | A | 11/2000 | Gatto | 6,345,261 | B1 | 2/2002 | Feidelson et al. |
| 6,149,056 | A | 11/2000 | Stinson et al. | 6,347,305 | B1 | 2/2002 | Watkins |
| 6,164,043 | A | 12/2000 | Miller et al. | 6,349,242 | B2 | 2/2002 | Mahaffey |
| 6,164,528 | A | 12/2000 | Hills et al. | 6,351,735 | B1 | 2/2002 | Deaton et al. |
| 6,167,386 | A | 12/2000 | Brown | 6,351,739 | B1 | 2/2002 | Egendorf |
| 6,169,975 | B1 | 1/2001 | White et al. | 6,360,254 | B1 | 3/2002 | Linden et al. |
| 6,170,744 | B1 | 1/2001 | Lee et al. | 6,367,013 | B1 | 4/2002 | Bisbee et al. |
| 6,175,823 | B1 | 1/2001 | Van Dusen | 6,367,693 | B1 | 4/2002 | Novogrod |
| 6,178,409 | B1 | 1/2001 | Weber et al. | 6,370,240 | B1 | 4/2002 | Woynoski et al. |
| 6,181,814 | B1 | 1/2001 | Carney | 6,370,514 | B1 | 4/2002 | Messner |
| 6,182,219 | B1 | 1/2001 | Feldbau et al. | 6,373,950 | B1 | 4/2002 | Rowney |
| 6,185,545 | B1 | 2/2001 | Resnick et al. | 6,377,935 | B1 | 4/2002 | Deaton et al. |
| 6,189,787 | B1 | 2/2001 | Dorf | 6,386,444 | B1 | 5/2002 | Sullivan |
| 6,193,152 | B1 | 2/2001 | Fernando et al. | 6,386,457 | B1 | 5/2002 | Sorie |
| 6,193,155 | B1 | 2/2001 | Walker et al. | 6,394,343 | B1 | 5/2002 | Berg et al. |
| 6,195,644 | B1 | 2/2001 | Bowie | 6,401,206 | B1 * | 6/2002 | Khan et al. .................... 713/176 |
| 6,199,761 | B1 | 3/2001 | Drexler | 6,405,176 | B1 | 6/2002 | Toohey |
| 6,202,005 | B1 | 3/2001 | Mahaffey | 6,405,182 | B1 | 6/2002 | Cuervo |
| 6,202,054 | B1 | 3/2001 | Lawlor et al. | 6,408,284 | B1 | 6/2002 | Hilt et al. |
| 6,206,283 | B1 | 3/2001 | Bansal et al. | 6,409,080 | B2 | 6/2002 | Kawagishi |
| 6,209,095 | B1 | 3/2001 | Anderson et al. | 6,411,942 | B1 | 6/2002 | Fujimoto |
| RE37,122 | E | 4/2001 | Levine et al. | 6,415,271 | B1 | 7/2002 | Turk et al. |
| 6,212,504 | B1 | 4/2001 | Hayosh | 6,419,161 | B1 | 7/2002 | Haddad et al. |
| 6,213,391 | B1 | 4/2001 | Lewis | 6,422,462 | B1 | 7/2002 | Cohen |
| 6,216,227 | B1 | 4/2001 | Goldstein et al. | 6,424,949 | B1 | 7/2002 | Deaton et al. |
| 6,219,994 | B1 | 4/2001 | Taniguchi | 6,424,951 | B1 | 7/2002 | Shurling et al. |
| 6,222,914 | B1 | 4/2001 | McMullin | 6,438,586 | B1 | 8/2002 | Hass |
| 6,223,166 | B1 | 4/2001 | Kay | 6,442,529 | B1 | 8/2002 | Krishan et al. |
| 6,223,168 | B1 | 4/2001 | McGurl et al. | 6,449,599 | B1 | 9/2002 | Payne et al. |
| 6,223,983 | B1 | 5/2001 | Kjonaas et al. | 6,449,616 | B1 | 9/2002 | Walker et al. |
| 6,226,623 | B1 | 5/2001 | Schein et al. | 6,450,407 | B1 | 9/2002 | Freeman et al. |
| 6,229,879 | B1 | 5/2001 | Walker et al. | 6,453,300 | B2 | 9/2002 | Simpson |
| 6,233,340 | B1 | 5/2001 | Sandru | 6,467,684 | B2 | 10/2002 | Fite et al. |
| 6,240,396 | B1 | 5/2001 | Walker et al. | 6,468,155 | B1 | 10/2002 | Zucker et al. |
| 6,246,996 | B1 | 6/2001 | Stein et al. | 6,473,500 | B1 | 10/2002 | Risaf et al. |
| 6,247,047 | B1 | 6/2001 | Wolff | 6,473,794 | B1 | 10/2002 | Guheen et al. |
| 6,253,027 | B1 | 6/2001 | Weber et al. | 6,484,936 | B1 | 11/2002 | Nicoll et al. |
| 6,260,024 | B1 | 7/2001 | Shkedy | 6,488,203 | B1 | 12/2002 | Stoutenburg et al. |
| 6,263,438 | B1 | 7/2001 | Walker et al. | 6,496,809 | B1 | 12/2002 | Nakfoor |
| 6,263,446 | B1 | 7/2001 | Kausik et al. | 6,502,745 | B1 | 1/2003 | Stimson et al. |
| 6,267,366 | B1 | 7/2001 | Graushar et al. | 6,502,747 | B1 | 1/2003 | Stoutenburg et al. |
| 6,269,369 | B1 | 7/2001 | Robertson | 6,505,179 | B1 | 1/2003 | Kara |
| 6,270,011 | B1 | 8/2001 | Gottfried | 6,510,453 | B1 | 1/2003 | Apfel et al. |
| 6,275,829 | B1 | 8/2001 | Angiulo et al. | 6,510,516 | B1 | 1/2003 | Benson et al. |
| 6,278,979 | B1 | 8/2001 | Williams | 6,510,983 | B2 | 1/2003 | Horowitz et al. |
| 6,282,516 | B1 | 8/2001 | Giuliani | 6,516,302 | B1 | 2/2003 | Deaton et al. |
| 6,282,522 | B1 | 8/2001 | Davis et al. | 6,516,357 | B1 | 2/2003 | Hamann et al. |
| 6,283,366 | B1 | 9/2001 | Hills et al. | 6,519,571 | B1 | 2/2003 | Guheen et al. |

| | | |
|---|---|---|
| 6,523,067 B2 | 2/2003 | Mi et al. |
| 6,526,130 B1 | 2/2003 | Paschini |
| 6,532,451 B1 | 3/2003 | Schell et al. |
| 6,536,037 B1 | 3/2003 | Guheen et al. |
| 6,539,363 B1 | 3/2003 | Allgeier et al. |
| 6,547,132 B1 | 4/2003 | Templeton et al. |
| 6,549,119 B1 | 4/2003 | Turner |
| 6,554,184 B1 | 4/2003 | Amos |
| 6,561,339 B1 | 5/2003 | Olson et al. |
| 6,565,000 B2 | 5/2003 | Sehr |
| 6,571,339 B1 | 5/2003 | Danneels et al. |
| 6,575,358 B2 | 6/2003 | O'Callaghan et al. |
| 6,575,361 B1 | 6/2003 | Graves et al. |
| 6,578,014 B1 | 6/2003 | Murcko, Jr. |
| 6,588,658 B1 | 7/2003 | Blank |
| 6,601,038 B1 | 7/2003 | Kolls |
| 6,606,744 B1 | 8/2003 | Mikurak |
| 6,609,113 B1 | 8/2003 | O'Leary et al. |
| RE38,255 E | 9/2003 | Levine et al. |
| 6,615,166 B1 | 9/2003 | Guheen et al. |
| 6,615,190 B1 | 9/2003 | Slater |
| 6,618,705 B1 | 9/2003 | Wang et al. |
| 6,651,885 B1 | 11/2003 | Arias |
| 6,670,569 B2 | 12/2003 | Smith et al. |
| 6,671,818 B1 | 12/2003 | Mikurak |
| 6,678,664 B1 | 1/2004 | Ganesan |
| 6,701,216 B2 | 3/2004 | Miller et al. |
| 6,704,714 B1 | 3/2004 | O'Leary et al. |
| 6,708,176 B2 | 3/2004 | Strunk et al. |
| 6,721,713 B1 | 4/2004 | Guheen et al. |
| 6,732,916 B1 | 5/2004 | Fazzano |
| 6,732,922 B2 | 5/2004 | Lindgren et al. |
| 6,733,387 B2 | 5/2004 | Walker et al. |
| 6,736,314 B2 | 5/2004 | Cooper et al. |
| 6,738,689 B2 | 5/2004 | Sansone |
| 6,745,327 B1 * | 6/2004 | Messing ........................ 713/170 |
| 6,760,711 B1 | 7/2004 | Gillett et al. |
| 6,761,309 B2 | 7/2004 | Stoutenburg et al. |
| 6,761,311 B1 | 7/2004 | Algiene et al. |
| 6,792,110 B2 | 9/2004 | Sandru |
| 6,801,833 B2 | 10/2004 | Pintsov et al. |
| 6,802,500 B2 | 10/2004 | Bennett et al. |
| 6,814,282 B2 | 11/2004 | Seifert et al. |
| 6,827,260 B2 | 12/2004 | Stoutenburg et al. |
| 6,829,588 B1 | 12/2004 | Stoutenburg et al. |
| 6,844,660 B2 | 1/2005 | Scott |
| 6,847,947 B1 | 1/2005 | Kambour et al. |
| 6,886,742 B2 | 5/2005 | Stoutenburg et al. |
| 6,907,408 B2 | 6/2005 | Angel |
| 6,908,031 B2 | 6/2005 | Seifert et al. |
| 6,911,910 B2 | 6/2005 | Sansone et al. |
| 6,922,673 B2 | 7/2005 | Karas et al. |
| 6,943,312 B2 | 9/2005 | Zimmermann |
| 6,950,810 B2 | 9/2005 | Lapsley et al. |
| 7,070,094 B2 | 7/2006 | Stoutenburg et al. |
| 7,073,242 B2 | 7/2006 | Bennett et al. |
| 7,086,584 B2 | 8/2006 | Stoutenburg et al. |
| 7,092,916 B2 | 8/2006 | Diveley et al. |
| 7,099,878 B2 | 8/2006 | Bruce et al. |
| 7,103,577 B2 | 9/2006 | Blair et al. |
| 7,104,439 B2 | 9/2006 | Dewan et al. |
| 7,104,440 B2 | 9/2006 | Hansen et al. |
| 7,107,249 B2 | 9/2006 | Dively et al. |
| 7,120,606 B1 * | 10/2006 | Ranzini et al. ................... 705/64 |
| 7,152,045 B2 * | 12/2006 | Hoffman ......................... 705/43 |
| 7,246,244 B2 * | 7/2007 | Nanavati et al. ............... 713/186 |
| 7,664,703 B2 * | 2/2010 | Hansen et al. ................... 705/43 |
| 2001/0001856 A1 | 5/2001 | Gould et al. |
| 2001/0018660 A1 | 8/2001 | Sehr |
| 2001/0023409 A1 | 9/2001 | Keil |
| 2001/0023415 A1 | 9/2001 | Keil |
| 2001/0025879 A1 | 10/2001 | Kawagishi |
| 2001/0032878 A1 | 10/2001 | Tsiounis et al. |
| 2001/0034720 A1 | 10/2001 | Armes |
| 2001/0037316 A1 | 11/2001 | Shiloh |
| 2001/0037455 A1 | 11/2001 | Lawandy et al. |
| 2001/0042785 A1 | 11/2001 | Walker et al. |
| 2001/0047330 A1 | 11/2001 | Gephart et al. |
| 2001/0047342 A1 | 11/2001 | Cuervo |
| 2001/0051876 A1 | 12/2001 | Seigel et al. |
| 2001/0054003 A1 | 12/2001 | Chien et al. |
| 2002/0007320 A1 | 1/2002 | Hogan et al. |
| 2002/0016769 A1 | 2/2002 | Barbara et al. |
| 2002/0022966 A1 | 2/2002 | Horgan |
| 2002/0023055 A1 | 2/2002 | Antognini et al. |
| 2002/0026412 A1 | 2/2002 | Kabin |
| 2002/0032653 A1 | 3/2002 | Schutzer |
| 2002/0038289 A1 | 3/2002 | Lawlor et al. |
| 2002/0040346 A1 | 4/2002 | Kwan |
| 2002/0046106 A1 | 4/2002 | Ishibashi et al. |
| 2002/0046116 A1 | 4/2002 | Hohle et al. |
| 2002/0062253 A1 | 5/2002 | Dosh, Jr. et al. |
| 2002/0062285 A1 | 5/2002 | Amann |
| 2002/0065712 A1 | 5/2002 | Kawan |
| 2002/0065716 A1 | 5/2002 | Kuschill |
| 2002/0067827 A1 | 6/2002 | Kargman |
| 2002/0076018 A1 | 6/2002 | Banks et al. |
| 2002/0079364 A1 | 6/2002 | Davies |
| 2002/0082920 A1 | 6/2002 | Austin et al. |
| 2002/0087337 A1 | 7/2002 | Hensley |
| 2002/0087462 A1 | 7/2002 | Seifert et al. |
| 2002/0087463 A1 | 7/2002 | Fitzgerald et al. |
| 2002/0087467 A1 | 7/2002 | Mascavage et al. |
| 2002/0087469 A1 | 7/2002 | Ganesan et al. |
| 2002/0088851 A1 | 7/2002 | Hodes |
| 2002/0091573 A1 | 7/2002 | Hodes |
| 2002/0095387 A1 | 7/2002 | Sosa et al. |
| 2002/0099601 A1 | 7/2002 | Farrell |
| 2002/0099607 A1 | 7/2002 | Sosa et al. |
| 2002/0103746 A1 | 8/2002 | Moffett et al. |
| 2002/0104026 A1 | 8/2002 | Barra et al. |
| 2002/0107797 A1 | 8/2002 | Combaluzier |
| 2002/0111908 A1 | 8/2002 | Milberger et al. |
| 2002/0112236 A1 | 8/2002 | Sukeda et al. |
| 2002/0120514 A1 | 8/2002 | Hagmeier et al. |
| 2002/0120582 A1 | 8/2002 | Elston et al. |
| 2002/0120846 A1 | 8/2002 | Stewart et al. |
| 2002/0123926 A1 | 9/2002 | Bushold et al. |
| 2002/0123962 A1 | 9/2002 | Bryman et al. |
| 2002/0128922 A1 | 9/2002 | Joao |
| 2002/0143566 A1 | 10/2002 | Diveley |
| 2002/0143626 A1 | 10/2002 | Voltmer et al. |
| 2002/0143706 A1 | 10/2002 | Diveley et al. |
| 2002/0143709 A1 | 10/2002 | Diveley et al. |
| 2002/0152168 A1 | 10/2002 | Neofytides et al. |
| 2002/0152176 A1 | 10/2002 | Neofytides et al. |
| 2002/0153414 A1 | 10/2002 | Stoutenburg et al. |
| 2002/0156683 A1 | 10/2002 | Stoutenburg et al. |
| 2002/0161702 A1 | 10/2002 | Milberger et al. |
| 2002/0166891 A1 | 11/2002 | Stoutenburg et al. |
| 2002/0169719 A1 | 11/2002 | Dively et al. |
| 2002/0174016 A1 | 11/2002 | Cuervo |
| 2002/0174334 A1 | 11/2002 | Meadow et al. |
| 2002/0184152 A1 | 12/2002 | Martin |
| 2002/0198806 A1 | 12/2002 | Blagg et al. |
| 2003/0009382 A1 | 1/2003 | D'Arbeloff et al. |
| 2003/0014371 A1 | 1/2003 | Turgeon |
| 2003/0023552 A1 | 1/2003 | Kight et al. |
| 2003/0024979 A1 * | 2/2003 | Hansen et al. ................. 235/379 |
| 2003/0028491 A1 | 2/2003 | Cooper |
| 2003/0044043 A1 | 3/2003 | Kaneda |
| 2003/0047605 A1 | 3/2003 | Mcclure et al. |
| 2003/0053609 A1 | 3/2003 | Risafi et al. |
| 2003/0055689 A1 | 3/2003 | Block et al. |
| 2003/0055780 A1 | 3/2003 | Hansen et al. |
| 2003/0061157 A1 | 3/2003 | Hirka et al. |
| 2003/0061171 A1 | 3/2003 | Gilbert et al. |
| 2003/0065624 A1 | 4/2003 | James et al. |
| 2003/0069856 A1 | 4/2003 | Seifert et al. |
| 2003/0085161 A1 | 5/2003 | Smith et al. |
| 2003/0088552 A1 | 5/2003 | Bennett et al. |
| 2003/0105725 A1 * | 6/2003 | Hoffman ........................ 705/75 |
| 2003/0111529 A1 | 6/2003 | Templeton et al. |
| 2003/0120571 A1 | 6/2003 | Holm-Blagg |
| 2003/0120777 A1 | 6/2003 | Thompson et al. |
| 2003/0126036 A1 | 7/2003 | Mascavage et al. |
| 2003/0126075 A1 | 7/2003 | Mascavage et al. |
| 2003/0126083 A1 | 7/2003 | Seifert et al. |

| Publication No. | Date | Inventor |
|---|---|---|
| 2003/0130907 A1 | 7/2003 | Karas et al. |
| 2003/0130940 A1* | 7/2003 | Hansen et al. ................ 705/39 |
| 2003/0130948 A1 | 7/2003 | Algiene et al. |
| 2003/0135438 A1 | 7/2003 | Blagg et al. |
| 2003/0135459 A1 | 7/2003 | Abelman et al. |
| 2003/0145205 A1 | 7/2003 | Sarcanin |
| 2003/0149662 A1 | 8/2003 | Shore |
| 2003/0154164 A1 | 8/2003 | Mascavage et al. |
| 2003/0158818 A1 | 8/2003 | George et al. |
| 2003/0163417 A1 | 8/2003 | Cachey et al. |
| 2003/0167231 A1 | 9/2003 | Winking et al. |
| 2003/0167237 A1 | 9/2003 | Degen et al. |
| 2003/0168510 A1 | 9/2003 | Allen |
| 2003/0171992 A1 | 9/2003 | Blagg et al. |
| 2003/0177067 A1 | 9/2003 | Cowell et al. |
| 2003/0182218 A1 | 9/2003 | Holm-Blagg |
| 2003/0182247 A1 | 9/2003 | Mobed et al. |
| 2003/0187789 A1 | 10/2003 | Karas et al. |
| 2003/0187791 A1 | 10/2003 | Weichert et al. |
| 2003/0187792 A1 | 10/2003 | Hansen et al. |
| 2003/0195811 A1 | 10/2003 | Hayes et al. |
| 2003/0208445 A1 | 11/2003 | Compiano |
| 2003/0212620 A1 | 11/2003 | Holm-Blagg |
| 2003/0212629 A1 | 11/2003 | King |
| 2003/0222135 A1 | 12/2003 | Stoutenburg et al. |
| 2003/0222136 A1 | 12/2003 | Bolle et al. |
| 2003/0225689 A1 | 12/2003 | MacFarlane et al. |
| 2003/0225708 A1 | 12/2003 | Park et al. |
| 2003/0236728 A1 | 12/2003 | Sunderji et al. |
| 2004/0002918 A1 | 1/2004 | McCarthy et al. |
| 2004/0015438 A1 | 1/2004 | Compiano et al. |
| 2004/0024701 A1 | 2/2004 | Hansen et al. |
| 2004/0030657 A1 | 2/2004 | Holm Blagg et al. |
| 2004/0049316 A1 | 3/2004 | Pintsov et al. |
| 2004/0054622 A1 | 3/2004 | Strayer et al. |
| 2004/0059672 A1 | 3/2004 | Baig et al. |
| 2004/0065726 A1 | 4/2004 | McGee et al. |
| 2004/0068437 A1 | 4/2004 | McGee et al. |
| 2004/0078327 A1 | 4/2004 | Frazier et al. |
| 2004/0083170 A1 | 4/2004 | Bam et al. |
| 2004/0088248 A1 | 5/2004 | Cutler |
| 2004/0088261 A1 | 5/2004 | Moore et al. |
| 2004/0098326 A1 | 5/2004 | James et al. |
| 2004/0098328 A1 | 5/2004 | Grant et al. |
| 2004/0098335 A1 | 5/2004 | Michelsen |
| 2004/0107165 A1 | 6/2004 | Blair et al. |
| 2004/0117302 A1 | 6/2004 | Weichert et al. |
| 2004/0118914 A1 | 6/2004 | Smith et al. |
| 2004/0138947 A1 | 7/2004 | McGee et al. |
| 2004/0138989 A1 | 7/2004 | O'Malley |
| 2004/0139004 A1 | 7/2004 | Cohen et al. |
| 2004/0139008 A1 | 7/2004 | Mascavage et al. |
| 2004/0143552 A1 | 7/2004 | Weichert et al. |
| 2004/0148286 A1 | 7/2004 | Rogers |
| 2004/0153398 A1 | 8/2004 | Baumgartner et al. |
| 2004/0158521 A1 | 8/2004 | Newton et al. |
| 2004/0158532 A1 | 8/2004 | Breck et al. |
| 2004/0167821 A1 | 8/2004 | Baumgartner |
| 2004/0167860 A1 | 8/2004 | Baxter et al. |
| 2004/0186773 A1 | 9/2004 | George et al. |
| 2004/0193487 A1 | 9/2004 | Purcell et al. |
| 2004/0193551 A1 | 9/2004 | McGee et al. |
| 2004/0193897 A1 | 9/2004 | Van Volkenburgh |
| 2004/0210476 A1 | 10/2004 | Blair et al. |
| 2004/0210506 A1 | 10/2004 | Algiene et al. |
| 2004/0210521 A1 | 10/2004 | Crea et al. |
| 2004/0210523 A1 | 10/2004 | Gains et al. |
| 2004/0211830 A1 | 10/2004 | Algiene |
| 2004/0211831 A1 | 10/2004 | Stoutenburg et al. |
| 2004/0254833 A1 | 12/2004 | Algiene et al. |
| 2004/0260607 A1 | 12/2004 | Robbins et al. |
| 2005/0004702 A1 | 1/2005 | McDonald |
| 2005/0017067 A1 | 1/2005 | Seifert et al. |
| 2005/0077744 A1 | 4/2005 | Bennett et al. |
| 2005/0097037 A1 | 5/2005 | Tibor |
| 2005/0107152 A1 | 5/2005 | McGee et al. |
| 2005/0108127 A1 | 5/2005 | Brown |
| 2005/0125360 A1 | 6/2005 | Tidwell et al. |
| 2005/0137986 A1 | 6/2005 | Kean |
| 2005/0159993 A1 | 7/2005 | Kordas et al. |
| 2005/0167481 A1 | 8/2005 | Hansen et al. |
| 2005/0173520 A1 | 8/2005 | Jaros et al. |
| 2005/0180550 A1 | 8/2005 | McGee et al. |
| 2005/0187929 A1 | 8/2005 | Staggs |
| 2005/0209958 A1 | 9/2005 | Michelsen |
| 2005/0209961 A1 | 9/2005 | Michelsen |
| 2005/0211760 A1 | 9/2005 | Dewan et al. |
| 2005/0261967 A1 | 11/2005 | Barry et al. |
| 2005/0289024 A1 | 12/2005 | Hahn-Carlson et al. |
| 2006/0149667 A1 | 7/2006 | Barry |
| 2006/0177061 A1 | 8/2006 | Orsini et al. |
| 2006/0193472 A1 | 8/2006 | Yuen |
| 2006/0277144 A1 | 12/2006 | Ranzini et al. |

FOREIGN PATENT DOCUMENTS

| | | |
|---|---|---|
| CA | 1270326 | 6/1990 |
| CA | 1299291 | 4/1992 |
| CA | 2094281 | 4/1992 |
| CA | 2175473 | 5/1995 |
| CA | 2271178 | 7/1999 |
| CA | 2333692 | 10/1999 |
| CA | 2276641 | 12/2000 |
| CA | 2383173 | 1/2001 |
| CA | 2432025 | 6/2001 |
| CA | 2225427 | 12/2001 |
| CA | 2402993 | 7/2002 |
| CA | 2462398 A1 | 12/2002 |
| CA | 2452958 A1 | 1/2003 |
| EP | 0 253 240 A1 | 1/1988 |
| EP | 481135 A1 | 4/1992 |
| EP | 50234 A2 | 5/1993 |
| EP | 700023 A1 | 8/1995 |
| EP | 745961 A2 | 4/1996 |
| EP | 725376 A2 | 8/1996 |
| EP | 0 933 717 A2 | 8/1999 |
| EP | 0 933 717 A3 | 8/1999 |
| EP | 0 836727 B1 | 9/1999 |
| EP | 949596 A2 | 10/1999 |
| EP | 843292 A3 | 11/1999 |
| EP | 0 987 642 A2 | 3/2000 |
| EP | 1 011 060 A1 | 6/2000 |
| EP | 1077436 A2 | 2/2001 |
| EP | 1 139 252 A2 | 10/2001 |
| EP | 1 232 776 A2 | 8/2002 |
| FR | 2728983 A1 | 7/1996 |
| GB | 2 274 349 A | 7/1994 |
| JP | 0 2217990 A | 8/1990 |
| JP | 0 9058451 A | 2/1997 |
| JP | 0 9084951 A | 3/1997 |
| JP | 0 9193580 A | 7/1997 |
| JP | 10-249052 A | 9/1998 |
| WO | WO 93/08546 A1 | 4/1993 |
| WO | WO 96 26508 A1 | 8/1996 |
| WO | WO 96 33385 A1 | 10/1996 |
| WO | WO 96 38801 A1 | 12/1996 |
| WO | WO 97 17212 A1 | 5/1997 |
| WO | 97/43893 | 11/1997 |
| WO | WO 98 13794 A1 | 4/1998 |
| WO | WO 98 49644 A1 | 11/1998 |
| WO | WO 98 50875 A2 | 11/1998 |
| WO | WO 98/ 06050 A | 12/1998 |
| WO | WO 99 22291 A1 | 5/1999 |
| WO | WO 99 28872 A1 | 6/1999 |
| WO | WO 99/66436 A1 | 12/1999 |
| WO | WO 00/21004 A | 4/2000 |
| WO | WO 00/22559 A1 | 4/2000 |
| WO | WO 00/46725 A1 | 8/2000 |
| WO | WO 00/54122 A2 | 9/2000 |
| WO | WO 00/67177 A2 | 11/2000 |
| WO | WO 00/79452 A2 | 12/2000 |
| WO | WO 01/04816 A1 | 1/2001 |
| WO | WO 01/04846 A1 | 1/2001 |
| WO | WO 01/33522 A1 | 5/2001 |
| WO | WO 01/39093 A1 | 5/2001 |
| WO | WO 01 69347 A3 | 9/2001 |
| WO | WO 01/75744 A1 | 10/2001 |
| WO | WO 01/86600 A2 | 11/2001 |
| WO | WO 01/92989 A2 | 12/2001 |

| | | |
|---|---|---|
| WO | WO 02/01469 A2 | 1/2002 |
| WO | WO 02/05195 A1 | 1/2002 |
| WO | WO 02/39368 A1 | 5/2002 |
| WO | WO 2004/008372 A2 | 1/2004 |
| WO | WO 2004/008399 A2 | 1/2004 |
| WO | WO 94/21066 A1 | 9/2004 |

OTHER PUBLICATIONS

U.S. Appl. No. 10/773,642, filed Feb. 6, 2004, Sgambati et al.
U.S. Appl. No. 10/047,917, filed Jan. 14, 2002, Kroon.
U.S. Appl. No. 10/773,642, filed Feb. 6, 2004, Sgambati et al.
About Western Union: Company History; http://www.payment-solutions.com/history.html, 2005, 2 pages.
Aeromexico and Western Union Partner to Offer a Cash Payment Option for Booking Airtime Tickets; 2004, Press Release, 2 pages.
American Express in New Ad Drive; 1990, American Banker, 1 page.
American Express Introduces Automated Money Order Dispenser; 1991, Professional Check Cashier, 1 page.
American Express Money Orders, Travelers Cheques Now on Sale; 1936, Dots and Dashes, 2 pages.
American Express Unit Introduces State-of-the-Art Automated Money Order Dispenser; 1990, Tri-State Food News, 1 page.
American Greeting Cards Click-Through; no date, 38 pages.
Amerinet, Inc., "Debit-it!—The Best Idea in Payment Systems Since the Credit Card", downloaded from website http://www.debit-it.com/ on Feb. 7, 2000, 8 pages.
Amex aims expansion strategy at local currency exchanges; 1990, Crain's Chicago Business, 1 page.
Amex Money Order Dispenser; 1990, The Nilson Report, 1 page.
Amex tests Moneygram; 1990, Adnews, 1 page.
And a Nine—Second Money Order Dispenser; 1991, Post-News, vol. 17, No. 1, 1 page.
Andrejczak—DIALCG File—American Banker-v164-date May 17, 1999 pp. 2.
Announcing Quick Collect Onine; 2002, Western Union's Professional Collector, 3 pages.
Annual Report of First Data Corporation; 1998, 3 pages.
Annual Report of First Data Corporation; 1999, 2 pages.
Annual Report of the President of the Western Union Telegraph Company; 1873, pp. 8-11.
Annual Report of the President of the Western Union Telegraph Company; 1874, pp. 8-11.
Annual Report of the Western Union Corporation; 1990, 4 pages.
Annual Report of the Western Union Telegraph Company; 1975, 3 pages.
Annual Report of the Western Union Telegraph Company; 1935, 2 pages.
Annual Report of the Western Union Telegraph Company; 1940, pp. 9 and 22.
Annual Report of the Western Union Telegraph Company; 1947, 2 pages.
Annual Report of the Western Union Telegraph Company; 1949, 2 pages.
Annual Report of the Western Union Telegraph Company; 1951, 2 pages.
Annual Report of the Western Union Telegraph Company; 1953, 2 pages.
Annual Report of the Western Union Telegraph Company; 1954, 3 pages.
Annual Report of the Western Union Telegraph Company; 1973, 5 pages.
Annual Report of the Western Union Telegraph Company; 1974, 2 pages.
Annual Report of the Western Union Telegraph Company; 1978, 2 pages.
Annual Report of the Western Union Telegraph Company; 1981, 2 pages.
Anonymous: "Payment Systems: Western Union Service for Overdue Accounts Resolving Delinquent Cards," Card News, Potomac: Aug. 13, 1990, vol. 5, Iss 15, p. 4.
Anonymous: "Western Union Service Growing" Bank Letter, New York: May 28, 1990, vol. 14, Iss 21, p. 8.
Arthas Corp., dotBank, The Way to Send and Receive Money on the Internet, downloaded from website dotbank.com on Feb. 7, 2000.
Arthur, Dwight, "AADS Option for Buyer Authentication", Response to NACHA/IC ANt2 RFI; 2 pages; Sep. 14, 1998.
AT&T Wireless to Offer Western Union SwiftPay as Replenishment Option for AT&T Free2Go Wireless Prepaid Customers; 2001, PR Newswire Association, 2 pages.
Author Unknown "PayPal News", www.andrys.com/paypal.html, published prior to 2003, 3 pages.
Author Unknown "PayPal.com Case Study" http://fox.rollins.edu/~slackman/paypal.htm, 2001, 6 pages.
Behind the Scenes of Life; 1996, First Data Corporation Annual Report, 3 pages.
Bidpay.com: Whois search results; 2003, http://www.networksolutions.com/en_US/whois/results.jhtml;jsessionid+VZDZVYDD1J, 2 pages.
BidPay: Seller FAQs—Receiving Payments and Using the Money Order Service; 1999-2003, 7 pages.
billserv.com Launches bills.com, an internet Portal for Consumers to Pay All Bills Online at No Cost; 2000, Business Wire, 2 pages.
Boneh, Dan "Beaming Money by Email is Web's Next killer App", PR Newswire, Nov. 16, 1999, pp. 1-4.
Business Wire, "E-Commerce, Email and E-greeting Cards Combine in New Web Site Designed by Interactive Bureau", Sep. 14, 1999 (abstract), [online] [retrieved on May 1, 2002], retrieved from PROQUEST Database, 2 pages.
Candygram payment service, no date, 1 page.
CES/NaBANCO Introduces Stored Value Card Technology: Blockbuster Video is First Merchant Partner; 1996, First Data Corporation News Release, 3 pages.
Collect your delinquent accounts by Telegraph; 1933, Form 1229-A, 1 page.
Collection by Money Transfer: MoneyGram Service Removes Time-Consuming Steps to Commercial Collections, 1990, Collector, p. 36.
Common Values: Uncommon Opportunities; 1995, First Data Corporation Annual Report, 2 pages.
Company Profile: The Western Union Convenience Pay Service; 2004, 4 pages.
Concord EFS, Inc. brochure entitled "Risk Management Services: IDLogix C100 Handheld Terminal-Detecting Invalid and Counterfeit Identification", published on or before 2005, 4 pages.
Concord EFS, Inc. brochure entitled "Risk Management Services", published on or before 2005, 8 pages.
Confinity, Inc. "PayPal for the Palm", www.handheldnew.com/file.asp?ObjectID=5401, published prior to Oct. 2003, 2 pages.
Confinity, Inc., PayPal.com, How PayPal.com Works, download from website http://www.paypal.com on Feb. 7, 2000, 7 pages.
Cornwell, Ted: "Western Union Reports Growth in Late payment Collection Service." National Mortgage News. New York. May 5, 1997. vol. 21; p. 64.
DOTBANK, "The Way to Send and Receive Money on the Internet," download from website http://www.dotbank.com, Feb. 7, 2000, 6 pages.
Dots and Dashes; 1935, vol. 11, No. 9, 4 pages.
FDR to Offer HNC Software's Real-Time Fraud Detection: New distribution Agreement to Benefit Card Banks; 1996, First Data Resources News Release, 3 pages.
Federal Benefits Checks are Going Away-Don't Let Your Customers Go with Them: Announcing the Western Union Benefits Quick Cash Program; 4 pages.
First Data Acquires PaySys International; 2001, Press Release, 2 pages.
First Data Aligns with CyberCash to Offer New Electronic Coin Service; 1996, First Data Corporation News Release, 3 pages.
First Data and Netscape Announce Program to Help Businesses Establish Payment-Enabled Web Sites; 1996, First Data Corporation News Release, 5 pages.
First Data and Netscape Offering Internet Payment Processing Service; 1996, First Data Corporation News Release, 3 pages.
First Data InfoSource Offers Database Analysis with DecisionScope; 1996, First Data Corporation News Release, 2 pages.

First Data to Offer Card Profitability Software from HNC: Distribution Agreement Poised to Repeat Falcon Success;1996, HNC Software, Inc. News Release, 3 pages.
First Data, First USA Paymentech, GE Captial Invest in First Virtual Holdings; 1996, First Virtual Holdings Corporation News Release, 3 pages.
First located example of a money transfer; Aug. 25, 1873, 1 page.
Gerin-Companies see huge demand for biometrics with TSA—Sep. 13, 2004—2 pages.
Get your Collect Card; 1939, Dots and Dashes, 2 pages.
Greenia—1952 Website computermuseumli—Lexikon Services 1982 2002-2003 pp. 3.
Guess What? The checks's not in the mail; 2001, Westen Union's Professional Collector, 3 pages.
Guide to Internet Security; Public Key Cryptography, http://www.e-certify.com/library/pkc_guide.htm, 5 pages, printed date Feb. 18, 2003.
Hoffman, Karen Epper "PayPal Still Running Free, But the e-payments company's carefree days may be numbered if regulators decide it's essentially a bank" Bank Technology News, published between 2001-2003, www.banktechnews.com/btn/articles/btnoct01-13.shtml, 3 pages.
How money by phone was paid;; Money Transfer Service: Book of Rules and List of Offices; 1926, Western Union Telegraph Company, 3 pages.
Idealab Company, "PayMe.com," download from website http://ssl.idealab.com on Feb. 16, 2000, 7 pages.
If you're not getting your payment with Quick Collect, chances are you're not getting it; 2001, 2 pages.
Introducing the Western Union Cash Card Program; 1998, 2 pages.
It takes a certain person to make a good collector. But it takes a good manager to make a champion; 2001, Western Union's Professional Collector, 3 pages.
LaMacchia, Brian A., "Bal's PGP Public Key Server," http://www.complaw.com/pgp/webkeyserver.html, 2 pages, printed date Feb. 18, 2003.
Lan Airline Alliance Carriers and Western Union Offer Travelers Additional Payment Options; 2005, 3 pages.
Last of the Pony Express Riders Tells His Story; 1932, Dots and Dashes, vol. 8, No. 10, 2 pages.
Latour, Almar "PayPal Electronic Plan May be On the Money in Years to Come", The Wall Street Journal Interactive Edition, Nov. 15, 1999, downloaded from www.paypal.com/html/wsj.html, 2 pages.
Lawton, George; "Biometrics: A New Era in Security"; 1998, Computer, vol. 31, No. 8, pp. 16-18.
Leading Provider of Transaction Card Processing Selects Connect Oneserver Software as a Solution for Advanced Internet Merchant Services: First Data Chooses OneServer as an Application to Deliver the Internet to Banks and Merchants; 1996, press Release, 4 pages.
Levin, Gary; "Western Union not fading into sunset; new services are added as telegrams drop"; 1992, 2 pages.
Linn, John, "Trust Models and Management in Public-Key Infrastructures," RSA Laboratories, 13 pages, Nov. 6, 2000.
List of Prepaid Services; http://www.westernunion.com/info/osComparePrePaid.asp, 1 page.
Loved one stranded? Send Cash; 1991, Akron Beacon Journal, 2 pages.
Luxury Brands LLC: World Famous Brands at Liquidation Prices; http://www.auctionbytes.com/cab/pages/payment, 3 pages.
McEnaney-DIALCG File 01896530—Akron Beacon Journal—Jul. 12, 1997—3 Pages.
Messenger Work Full of Adventure, Excitement; 1933, Dots and Dashes, vol. 9, No. 11, 2 pages.
Money Order with confirmation; 1948, 1 page.
Money Orders by Phone; 1935, Fortune Magazine, 3 pages.
Money-wire giants battle for business: Currency exchanges wooed; 1991, Chicago Sun Times, 2 pages.
MoneyZap.com Greeting Card Process Flow; 2000, 2 pages.
Nation Receives Time Over Western Union Network; 1931, Dots and Dashes, vol. 7, No. 5, 2 pages.
Nationwide Credit Collectors Act Globally; 2001, Western Union's Professional Collector, 3 pages.

Netscape Announces Netscape Livepayment to Facilitate Internet Commerce; 1996, Netscape News Release, 4 pages.
New Western Union SwiftPay Service Continues Expansion of Consumer-to-Business Payment Options; 1999, PR Newswire Association, 2 pages.
NTS Completes Merger with EDS Fleet Services; New First Data Unit Sets Sights on New Markets; 1996, NTS Press Release, 3 pages.
Only Western Union, no date, 2 pages.
PayPal for the Palm; http://handheldnews.com/file.asp?ObjectID=5401, Printed date Oct. 10, 2003; 2 pages.
PayPal.com Case Study; http://fox.rollins.edu/~slackman/PayPal.htm, 2003, 7 pages.
PayPal: The way to send and receive money online; 2002; 4 pages.
PayPal-News; http://www.ndrys.com/paypal.html, 2003, 3 pages.
PaySys—company overview, no date, 2 pages.
PaySys signs up four Asian distributors; 1997 Orlando Business Journal, 3 pages.
Picture of Bill payment form or advertisement, no date, 1 page.
Pilgrims Started Thanksgiving Custom; Dots and Dashes, vol. 4, No. 11, Nov. 1928, 2 pages.
Plotkin, Hal "Beam Me Up Some Cash" Silicon Valley Insider, Sep. 8, 1999, www.halplotkin.com/cnbcs029.htm, 3 pages.
PR Newswire—Western Union Financial Services forms—Aug. 22, 1991.pdf.
Press Release: "Western Union Announces ATM Card Payout for Money Transfer Transactions"; 2001, URL: http://news.firstdata.com/media/ReleaseDetail.cfm?ReleaseID=849995>.
Primary Payment Systems, Inc. brochure entitled "Risk Management Services: Decision Chek On-Site-Detecting Fraudulent Checks at the Point-of-Sale", 2003, 4 pages.
Primary Payment Systems, Inc. brochure entitled "Deposit Check—Preventing Losses on . . . Checks and Other Payments at Financial Institutions", 2002, 2 pages.
Primary Payment Systems, Inc. brochure entitled "Risk Management Services: Decision Chek—Preventing Check Losses at the Point-of-Presentment", 4 pages.
Primary Payment Systems, Inc. brochure entitled "Risk Management Services: Identity Chek—Web and Developer Service", 2003, 4 pages.
Primary Payment Systems, Inc. brochure entitled "Risk Management Services: Identity Chek-Detecting Fraud when Establishing New Relationships", 2003, 6 pages.
Products and Services from PaySys, no date, 2 pages.
Purchasing American Airlines Tickets Just Got Easier; 2005, 4 pages.
Quick Cash and Quick Collect: Western Union's money-movers; 1990, Newsbriefs, vol. 2, No. 1, 3 pages.
Quick Cash: A safe and reliable way to send funds around the world; http://www.payment-solutions.com/quickcash.htm, 1 page.
Quick Collect Sales Presentation; Jan. 2004, 28 pages.
Quick Collect: Government/Child Support Agency Name, Training Guide; 2004, 8 pages.
Quick Collect; Western Union Training Guide; 2004, 10 pages.
Quick Pay: The Convenient and reliable way to receive payments from customers worldwide; http://www.payment-solutions.com/quickpay.html, 2005, 3 pages.
Refund of Money Transfers; 1913, Journal of the Telegraph, 2 pages.
Remittance for order sent via Western Union; 1933, 2 pages.
Reynolds Arcade was Western Union Birthplace; 1933, Dots and Dashes, vol. 9, No. 8, 2 pages.
Rhode Island becomes first state to accept child support payments at Western Union: Government Payment Leader govONE Solutions Adds Walk-in to Full Suite of Payment Options; 2002, 3 pages.
Rhode Island becomes first state to accept child support payments at Western Union: More than 50 Western Union Convenience Pay Agent Locations Offer New Level of Convenience to Rhode Island Residents Who Pay Child Support—; 2002, 3 pages.
SBC Communications adds Western Union Locations for Walk-in Customer Bill Payments; SBC News Release, Sep. 7, 2005, 2 pages.
Seifert—Method & System for Electronic Transfer—FDC 016PUS—no date, 21 pages.
Send your payment using Western Union Quick Collect; Feb. 2, 2004 2 pages.
Send Your Utility Bill Payment from Here!; no date 3 pages.

Sending Cash in a Flash; 1990, Travel & Leisure, p. 42.
Sending Cash in a Flash: There are more ways to do it than you might think; 1991, 2 pages.
Shopping Order service and gift service; 1934, Western Union Telegraph Company, Money Order Book, 6 pages.
Signature Services: Helping financial institutions send funds faster; http://www.payment-solutions.com/signature.html, 205, 1 page.
State of Hawaii to Accept Child Support Payments at Western Union; 2004, 2 pages.
State of New York Banking Department: Staff Letters and Memoranda; 2000, http://www.banking.state.ny.us/lo000718.htm, 2 pages.
Steiner, Ina "PayPal Online Payment Service—Another Way to Pay for Auction Items" www.auctionbytes.com, Feb. 20, 2000, 4 pages.
Steiner, Ina: "Accepting Credit Cards When You Sell Items: ProPay and Billpoint Payment Services"; 2000 Auction Bytes, 4 pages.
Steiner, Ina: "BidPay.com Offers Click and Pay Service for buyers"; 2000, Auction Bytes, 4 pages.
Steiner, Ina: "Follow-up to BidPay Article"; 2000, Auction Bytes, 3 pages.
Stockel, Anna; "Securing Data and Financial Transactions"; 1995, Institute of Electrical and Electronics Engineers 29th Annual Conference, pp. 397-401.
Stoutenburg—Method & System for Performing Money Transfer Transactions—10-289802—no date, 30 Pages.
Stream, LitleNet, BBN, and KPMG Announce Industry-Wide Initiative to Enable Wide-Scale Software Electronic Commerce; 1996, News Release, 6 pages.
Survey of services; 1960, pp. 2-31.
The Western Union Telegraph Company: Delivery Department Instructions; 1926, Commercial Bulletin No. 9-A, 2 pages.
The Western Union Telegraph Company: Instructions for Receiving Clerks; 1929, Commercial Bulletin No. 37-A, 2 pages.
The Western Union Telegraph Company: Rules for Money Transfer Service; 1908, pp. 3-25.
The Yellow Blank is Correct for every social need; 1930, Western Union Booklet, 2 pages.
The Yellow Blank: When, Why, How to Use It, 1934, 5 pages.
To Send a Quick Collect Payment; sample form, no date, 1 page.
Transfer require ID made by telegraph; 1895, Tariff Book, 4 pages.
Transpoint, "The Way to Pay Online", downloaded from website http://www.transpoint.com/ on Feb. 10, 2000, 12 pages.
VeriFone Finance, "Fast, Low-Cost Transaction Automation at the Point of Service", Jan. 1999—2 pages.
VIPS Introduces MCSource to Managed Healthcare Industry; 1996, VIPS Healthcare Information Systems News Release, 2 pages.
VisionPLUS Consumer Payment Solution Overview, no date, 2 pages.
Wermer, Sandra; "A million credit card transactions in five hours"; 1997, Primeur, 2 pages.
Western Union—Now, using our service is even more rewarding; no date, 4 pages.
Western Union—Quarterly Report 3rd Quarter 1975—4 pages.
Western Union—Some Quick Facts about Quick Collect; no date, p. 1.
Western Union and Continental Airlines Introduce New Quick and Easy Cash Payment Option When Booking Flights; Jan. 5, 2004, Press Release, 2 pages.
Western Union—BidPay-Buyer FAQs, 1999-2003, 7 pages.
Western Union Creates Phone Card with BLT Technologies; 1997, PR Newswire Association, 2 pages.
Western Union Financial Services Inc.: There's a lot to be said about the many advantages of the Quick Collect service. And look who's saying it; 1995, 4 pages.
Western Union Financial Services, Inc.: Benefits Quick Cash Agreement and Disclosure Statement; 1998, 2 pages.
Western Union Financial Services, Inc.: Cash Card Agreement and Disclosure Statement; 1998, 2 pages.
Western Union Gift Greetings; no date, 6 pages.
Western Union Hotel-Motel Reservation Service, no date, 1 page.
Western Union Money Orders More Popular Than Ever: 1942, Dots and Dashes, vol. 18, No. 3, 2 pages.
Western Union Money Transfer & more—Printed date Jun. 10, 2003, 9 pages.
Western Union Money Transfer Services, Send Money Online, Money Orders, Send Telegrams; http://www.westernunion.com/info/osCompareMoneyMessage.asp, 2005, 3 pages.
Western Union New Supplement: Money Orders delivery through Mailgram: 1975, 2 pages.
Western Union News Supplement: Automatic travelers checks using Western Union; 1975, 2 pages.
Western Union Payment Services, Bidpay and Quick Collect, Online Bill Payment, Online Auction Payments; http://www.westernunion.com/info/osComparePayment.asp, 2005, 2 pages.
Western Union Products and Services: a brief description; 1960, 22 pages.
Western Union Quick Collect: First Data Corporation; 2000-2001,2004; 2 pages.
Western Union Quick Collect: The Fastest way to collect good funds; 1999, 11 pages.
Western Union Quick Collect: The most agents, the most locations, the most experienced; 2000, 2 pages.
Western Union Quick Collect; 3 Easy Ways to Send a Payment: In Person, Online or by Phone!; no date, 2 pages.
Western Union SwiftPay Selected by Sheakley Uniservice to Complete W-2 Reprint Transactions; 2000, PR Newswire Association, 2 pages.
Western Union Telegraph Company; 1933, Money Order Message, 17 pages.
Western Union/Money Zap: Send and receive money easily over the internet; http://www.moneyzap.com/main.asp, printed Dec. 1, 2000, 23 pages.
Western Union's Would-Be Rival; 1990, American Banker, 1 page.
When you're helping a customer make a crucial payment there's no room for guesswork; 2002, Western Union's Professional Collector, 3 pages.
Why Send Your Customers Across Town When You Can Send Them Next Door? 2005, 1 page.
Wijnen, Rene "You've Got Money!", Bank Technology News, Jun. 2000, pp. 1-4, vol. 13, Issue 6, New York.
x.com, "Do More with Your Money," download from website http://www.x.com., 5 pages, Feb. 7, 2000.
XP-002347909—Western Union Announces ATM Card Payout for Money Transfer Transactions—Oct. 22, 2001 p. 1.
You're sending more than a payment: Point-of-Sale & Mechandising Support Advertising Materials, no date, 2 pages.
You're sending more than a payment: You're sending peace of mind; 2004, 3 pages.
US 6,460,019, 10/2002, Walker et al. (withdrawn)

* cited by examiner

| Record # | One Time CC# | Assignment Table Pointer |
|---|---|---|
| 000,000,001 | 4891-3280-4378-2190 | |
| 000,000,002 | 1367-9329-4275-0183 | |
| 000,000,003 | 3740-1480-9642-4473 | |
| . | . | . |
| . | . | . |
| . | . | . |
| 005,000,001 | 9416-3551-8814-0178 | 532 |

FIG. 11    1100

SECURE MONEY TRANSFER SYSTEMS AND METHODS USING BIOMETRIC KEYS ASSOCIATED THEREWITH

CROSS-REFERENCES TO RELATED APPLICATIONS

The following U.S. patent application is being filed concurrently. The disclosure of this application is incorporated by reference in the present application in its entirety for all purposes: U.S. patent application Ser. No. 11/623,956, filed Jan. 17, 2007, entitled "Generation Systems And Methods For Transaction Identifiers Having Biometric Keys Associated Therewith".

FIELD OF THE INVENTION

Embodiments of the present invention relate generally to transaction settlement identifier generation systems and methods. More specifically, embodiments of the present invention relate to systems and methods for generating transaction settlement identifiers using biometric features.

BACKGROUND OF THE INVENTION

Fraud in eCommerce transactions has become a significant problem. Credit card issuers have created the "surrogate card number" model in an attempt to address this problem. According to this model, a "one time" credit card number is generated by a credit card issuer and automatically mapped back (by the issuer system) to the original card number during any subsequent authorization, capture or refund event. The original card number is, therefore, never exposed and in the event the "one time" number is compromised (e.g. a hacker successfully penetrates the merchant's system) the fraud risk is mitigated as the "one time" number is deactivated for further purchase activity once the first authorization event is processed.

While this model represents a significant improvement in online fraud management and has helped to establish consumer confidence in online commerce, it remains vulnerable to the threat of identity theft (commonly referred to as "phishing"). A variety of sophisticated techniques, including social engineering, are employed by fraudsters to discover consumer information (e.g. User Ids, passwords etc.) to enable them to perform seemingly valid transactions for fraudulent purposes. For example, in the "one time" card model, the fraudster would attempt to discover the consumer's password to enable the fraudster to request a valid "one time" credit card number to purchase goods online and have them shipped to a different address. Customers subsequently repudiate the transaction leaving the issuer in the position of adjudicator with consequential financial loss or reduction in customer satisfaction levels.

In essence the point of attack is starting to shift away from merchant's systems back to the issuer's systems. While the "surrogate card number" model is principally designed to effectively address merchant vulnerabilities, further expansion of the concept is needed to consider issuer side threats and vulnerabilities.

Likewise, fraud is a significant problem in money transfer transactions. Under typical practice, a sender visits an "agent" (i.e., agent of a money transfer system operator, such as Western Union of Englewood, Colo.) location to specify payee details (name, destination country and test question, if applicable) and pay applicable fees and principal amount to be transferred. The agent receipts the transaction details into a money transmission system and receives a Money Transfer Control Number ("MTCN") that uniquely references the transaction. The agent provides the MTCN to the sender. The sender advises the recipient (Payee) through independent means (e.g. phone call or SMS) of the transfer's availability for collection and the MTCN. The payee visits an agent location, and supplies the MTCN, appropriate identification and correct response to the test question (if applicable). The agent pays out the principal amount on successful completion of verification checks. Some of the foregoing steps may be performed by Internet-based means.

This model is vulnerable to a number of attacks. For example, a paying agent may collude with a fraudster and pay out funds without complying with local verification procedures. An unrelated agent in the paying country may also retrieve the transaction details from the money transfer software using limited search criteria and enable an accomplice to proceed with collection at a separate location in the expected payout country. Or, a number of fraudulently inclined individuals may present themselves simultaneously at different agent locations in the destination country of a transfer and all receive payout before the money transfer system is able to detect the problem.

Hence, a more robust payee authentication method is required at point of payout to secure the process from these attacks.

BRIEF SUMMARY OF THE INVENTION

One embodiment of the invention provides for a method of transferring funds from a sender to a recipient. The method may include receiving a request to transfer funds from a sender; creating a transaction record having a transaction identifier; providing the transaction identifier to the sender; receiving the transaction identifier from a recipient; obtaining a first biometric sample from the recipient; using the biometric sample to select a MTCN (Money Transfer Control Number) from a pool of predetermined MTCNs; associating the MTCN with the first biometric sample and the transaction record; providing the MTCN to the recipient; receiving a request from the recipient to receive the funds; obtaining the MTCN from the recipient; obtaining a second biometric sample from the recipient; using the MTCN and/or the second biometric sample to locate the transaction record; comparing the second biometric sample to the first biometric sample; and determining whether to provide the funds based on the comparison.

The method may also include determining whether the funds have been paid out and/or determining whether an amount of the funds exceeds a threshold amount of funds transferred for which compliance is required. The biometric sample may be a voiceprint, a fingerprint, a retinal scan, and/or a DNA sample.

Another embodiment of the invention provides for a method of transferring funds from a sender to a recipient. The method may include receiving a request from the recipient to stage the transaction; obtaining a first biometric sample from the recipient; using the first biometric sample to select a transaction number from a pool of predetermined transaction numbers; creating a transaction record having the transaction number and the first biometric sample associated therewith; providing the transaction number to the recipient; receiving a request from the sender to deposit the funds; receiving the transaction number from the sender; modifying the transaction record to indicate that the funds have been deposited; thereafter, receiving a request from the recipient to receive the funds; and using a second biometric sample, at least in part, to determine whether to provide the funds to the recipient.

The method may further include receiving the transaction number from the recipient; obtaining the second biometric sample from the recipient; using the transaction number and/ or the second biometric sample to locate the transaction record; comparing the first biometric sample to the second biometric sample; and based on the comparison, determining whether to issue a MTCN (Money Transfer Control Number). In another embodiment, the method may also include receiving the MTCN at a money transfer location; and providing the funds to the recipient. The method may further include determining whether the funds have been paid out and/or whether an amount of the funds exceeds a threshold amount of funds transferred for which compliance is required.

In another embodiment a second biometric sample may be used, at least in part, to determine whether to provide the funds to the recipient. This embodiment may include at a money transfer location, receiving a request to receive the funds from the recipient; receiving the transaction number from the recipient; using the transaction number to locate the transaction record; obtaining the second biometric sample from the recipient; and comparing the first biometric sample to the second biometric sample. The method may further include determining whether the funds have been paid out and/or whether an amount of the funds exceeds a threshold amount of funds transferred for which compliance is required. The biometric sample may include a voiceprint, a fingerprint, a retinal scan, and/or a DNA sample.

Another embodiment of the invention provides for a money transfer system that includes an input adapted to receive biometric samples; a storage arrangement configured to store the biometric samples or derivatives thereof; and a processor. The processor includes instructions to use a first biometric sample to select a MTCN (money transfer control number) from a pool of predetermined MTCNs; and link the first biometric sample to the MTCN. The biometric sample may include a voiceprint, a fingerprint, a retinal scan, and a DNA sample. The processor may also include instructions to respond to a request to settle a transaction using the MTCN by receiving a second biometric sample and comparing the second biometric sample to the first biometric sample. The processor may further include instructions to determine whether to provide funds to a recipient by determining whether the funds have been paid out and/or whether an amount of the funds exceeds a threshold amount of funds transferred for which compliance is required.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1A:
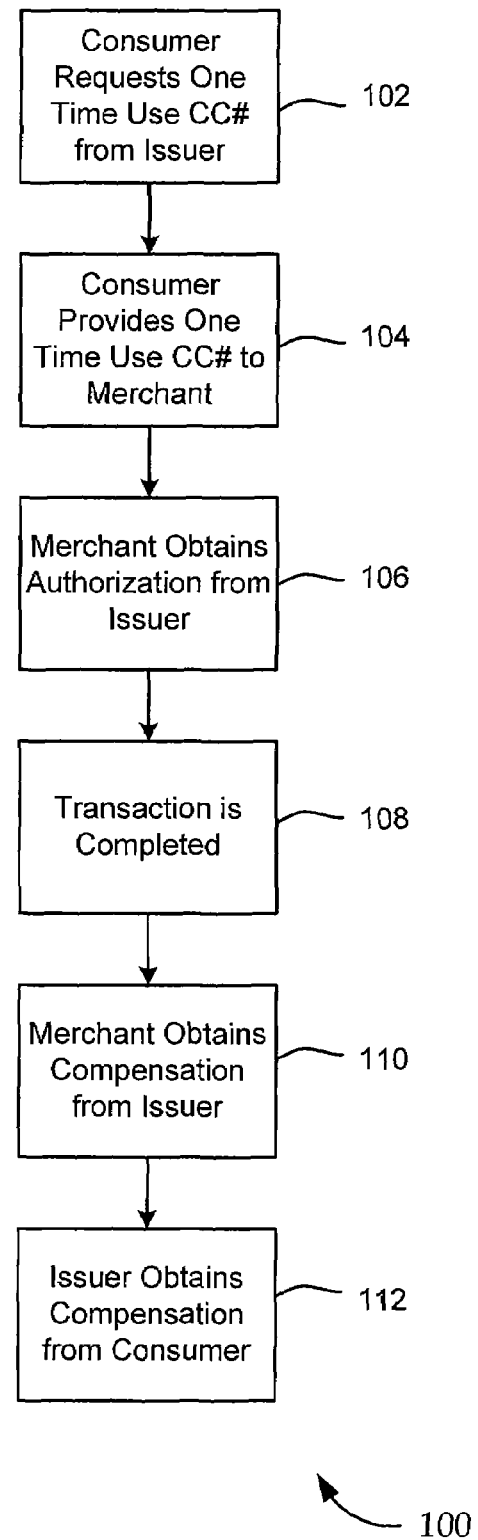
FIG. 1A depicts a typical purchase transaction in which a consumer uses a one-time-use credit card to complete a transaction with an online merchant according to one embodiment of the invention.

Embodiments of the present invention relate to systems and methods for assigning transaction settlement identifiers. In order to provide a context for describing embodiments of the present invention, embodiments of the invention will be described herein with reference to providing transaction settlement identifiers (aka "transaction settlement numbers") as one-time-use credit card numbers for purchase transactions and/or money transfer control number (MTCNs) for money transfer transactions. Those skilled in the art will appreciate, however, that other embodiments are possible. For example, embodiments of the invention may be used to provide brokerage account purchase and redemption transaction settlement numbers and the like.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It is to be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, systems may be shown in block diagrams in order not to obscure the embodiments in unnecessary detail. In other instances, well-known processes, structures and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

According to embodiments of the present invention, a biometric feature of an individual is used to generate a transaction identifier for subsequent use by the individual to complete a transaction. The transaction may be a purchase transaction, a money transfer transaction, or the like. The close association of the transaction identifier to the individual helps to minimize fraud associated with the transaction.

In the case of purchase transactions, a consumer provides a biometric sample to an issuer upon requesting the transaction identifier. The biometric sample may be a sample of any of a variety of biometric features of the consumer. For example, the consumer may provide a fingerprint, a voiceprint, DNA, retinal scan, or the like. Moreover, while embodiments of the present invention are described using a biometric feature of an individual to generate a transaction identifier, other physical identifiers may be used. For example, a PC signature or the keystroke dynamics of the user may be used. In such embodiments, the user may request a transaction identifier using a computer and use the PC signature or their keystroke dynamics to generate a transaction identifier. The PC signature or keystroke dynamics may be initiated locally by the user's computer or remotely through a network. Accordingly, while a biometric sample is used throughout the specification to describe embodiments of the invention, other physical identifiers uniquely identifying a user or user's system may be used to generate a transaction identifier.

The transaction identifier may be a one-time-use transaction identifier, such as a one-time-use credit card number, or the like. The issuer uses the biometric sample, or a function thereof (e.g., a hash), to select the transaction identifier from a large pool of transaction identifiers appropriate for the particular use. The consumer thereafter uses the transaction identifier to complete the transaction. In some cases, a second biometric sample is obtained from the consumer to authorize the transaction. In other cases, a second biometric sample is obtained only if the consumer attempts to repudiate the transaction.

In the case of money transfer transactions, a sender obtains a first transaction number upon depositing funds with a money transfer agent. The sender then provides the first transaction number to the desired recipient. The recipient then provides a biometric sample and the first transaction number to a money transfer system operator to receive a second transaction number (e.g., a MTCN, Money Transfer Control Number). The money transfer agent on the sender side, therefore, does not know the MTCN. The recipient then requests the funds deposited by the sender from a money transfer agent, which may be the same as the money transfer agent on the send side, but is most likely a different money transfer agent. At the time of request, the recipient provides the MTCN and a biometric sample. Only if the biometric sample matches the sample provided by the recipient to the money transfer system operator can the money transfer agent provide the funds. Hence, according to some embodiments, the transfer is protected from fraudulent collusion among money transfer agents since agents do not have access to transfer records using only an MTCN. Moreover, by providing a biometric sample at the time of receipt, a recipient is less able to claim not having received the funds. Further, embodiments of the present invention prevent multiple individuals from simultaneously requesting payment from different money transfer agents and receiving multiple payouts, since, presumably only one individual's biometric will result in transaction approval. Further still, collection of a biometric at the time of payment allows aggregation of transaction amounts for anti-money laundering compliance tracking.

Having described embodiments of the invention generally, attention is directed to FIG. 1A, which depicts a typical purchase transaction 100 in which a consumer uses a one-time-use credit card to complete a transaction with an online merchant. It will be appreciated, however, that, although embodiments of the present invention will be described herein with reference to online transactions using one-time-use credit cards, the present invention is not limited to such embodiments. This purchase transaction 100 begins at block 102 at which point a consumer requests and receives a one-time-use credit card number from an issuer. In doing so, the consumer provides, for example, an account number and password to the issuer. At block 104, the consumer uses the one-time-use credit card number to complete a purchase transaction with an online merchant. At block 106, the merchant obtains authorization for the transaction from the issuer, and the transaction is completed at block 108. Thereafter, the merchant obtains compensation for the transaction from the issuer at block 110, and the issuer obtains compensation from the consumer at block 112.

Figure 1B:
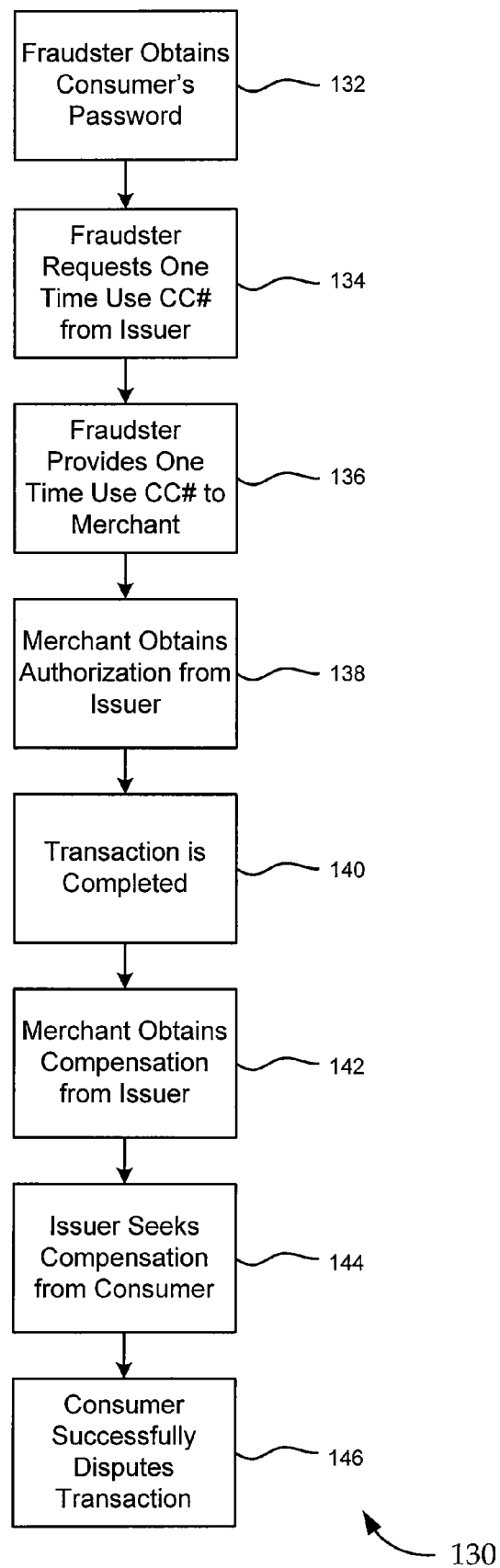
FIG. 1B depicts a purchase transaction in which a fraudster acquires account details from the consumer leaving the issuer unable to collect the transaction funds from the consumer according to one embodiment of the invention.

In the typical purchase transaction 100 of FIG. 1A, everything goes according to plan. FIG. 1B, however, depicts a purchase transaction 130 in which a fraudster acquires account details from the consumer leaving the issuer unable to collect the transaction funds from the consumer. The transaction 130 begins at block 132, at which point the fraudster obtains the consumer's account password. The fraudster then uses the password to obtain a one-time-use credit card number from the issuer (134) and complete a transaction with a merchant (136). Because the number appears to have been obtained by the consumer, the transaction is authorized (138) and completed (140). The merchant is able to obtain compensation from the issuer (142), but when the issuer attempts to obtain compensation from the consumer (144), the consumer is able to successfully repudiate the transaction (146). Hence, the issuer is penalized because of the consumer's failure to protect his password. Of course, the consumer may fraudulently repudiate the transaction, and the issuer has no ability to challenge him. Embodiments of the present invention provide a solution to this situation.

Figure 2:
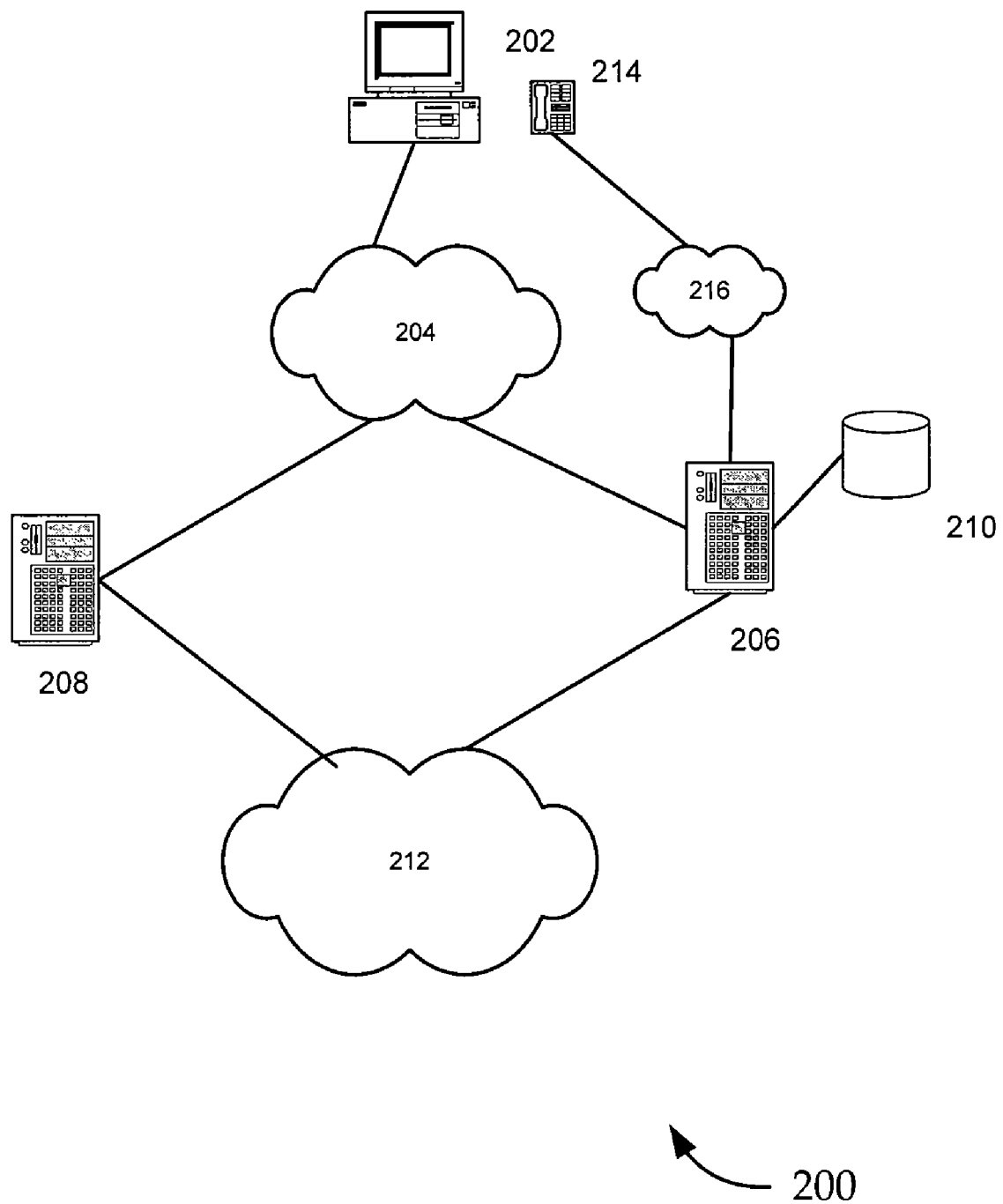
FIG. 2 illustrates an exemplary system according to one embodiment of the invention.

Attention is directed to FIG. 2, which illustrates an exemplary system 200 according to embodiments of the invention. Those skilled in the art will appreciate that the system 200 is merely exemplary of a number of possible system embodiments. The system includes a computer 202 associated with a consumer. The computer 202 may be any of a variety of well known computing devices such as, for example, a personal computer, a laptop computer, a personal digital assistant (PDA), a "Smart Phone," or the like. The consumer uses the computer 202 to communicate via a network 204 with a computer 206 associated with an issuer and/or an online merchant 208. The network 204 may be, for example, the Internet, but other embodiments are possible. The computer 206 associated with the issuer may be a host computer system that includes a mainframe computer, a collection of servers, and/or the like. The computer 206 has at least one associated data storage arrangement 210, which may be any of a variety of well know data storage arrangements. The computer 206 is programmed to perform the exemplary method embodiments disclosed herein.

The online merchant 208 may communicate with the issuer computer 204 via the network 204 or through a different network 212, which may be, for example, a credit card transaction processing network. The online merchant 208 communicates with the issuer to obtain authorization for credit card transactions.

According to some embodiments, the consumer obtains a one-time-use credit card by communicating with the issuer via the Internet. This assumes that the consumer is able to provide a biometric sample via the Internet. In other embodiments, the consumer may use a telephone 214 to contact the issuer via the PSTN (public switched telephone network) 216 or Internet using, for example VOIP (Voice Over Internet Protocol), to thereby provide a voice print. Those skilled in the art will appreciate, in light of the disclosure herein, a number of additional embodiments through which a consumer may provide a biometric sample to the issuer.

Figure 3A:
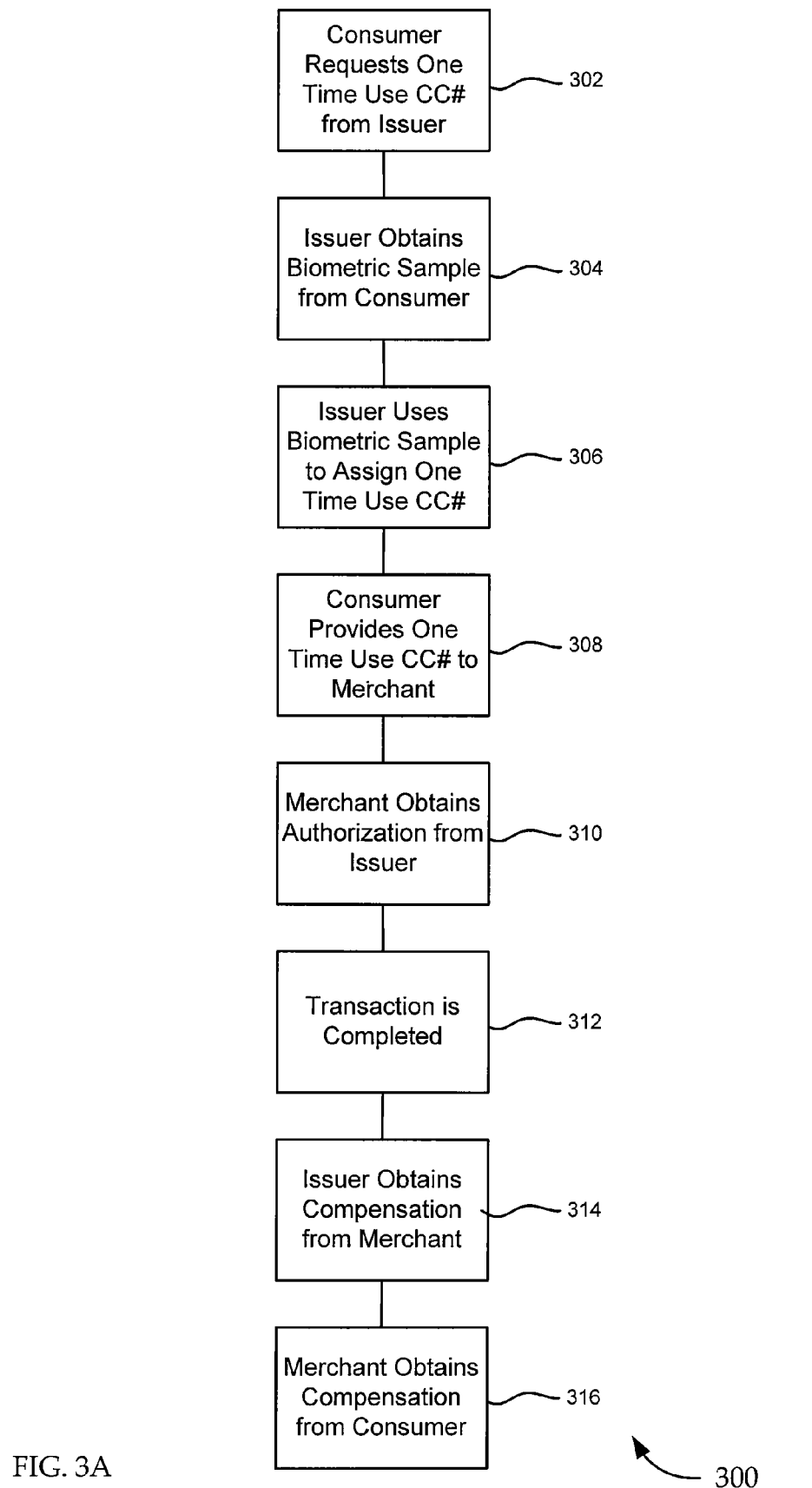
FIG. 3A depicts an exemplary method according to one embodiment of the invention.

Having described an exemplary system 200, attention is directed to FIG. 3A, which depicts an exemplary method 300 according to embodiments of the invention. The method 300 may be implemented in the system 200 of FIG. 2 or other appropriate system. The method 300 begins at block 302 at which point a consumer requests a one-time-use credit card number from an issuer. The issuer obtains a biometric sample from the consumer at block 304 and uses the biometric sample to assign a one-time-use credit card to the consumer from a large pool of suitable one-time-use credit card numbers at block 306. Thereafter, the consumer provides the one-time-use credit card number to a merchant at block 308 in the process of completing a purchase transaction. The merchant obtains authorization for the transaction from the issuer at block 310, and the transaction is completed at block 312. The merchant thereafter obtains compensation from the issuer for the transaction at block 314, and the issuer obtains compensation from the consumer at block 316.

Figure 3B:
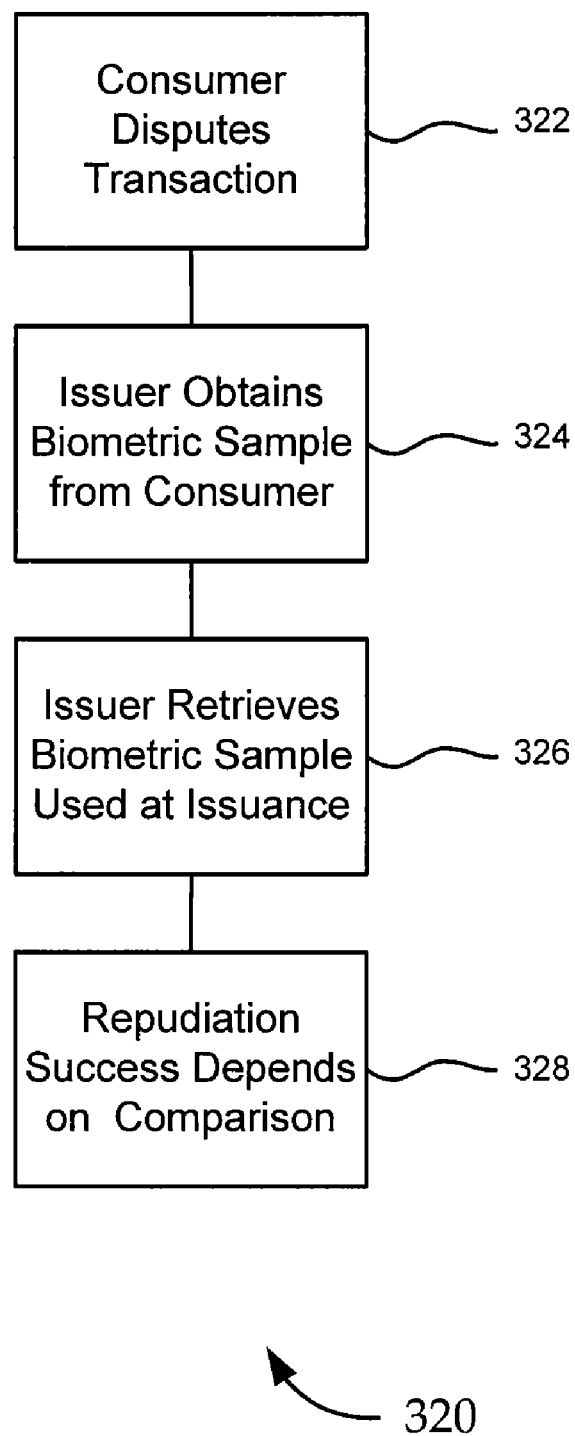
FIG. 3B depicts an exemplary repudiation process according to one embodiment of the invention.

The method 300 depicts the typical case in which the consumer does not attempt to repudiate the transaction. FIG. 3B depicts what happens if the consumer attempts to repudiate the transaction.

Attention is directed to FIG. 3B, which depicts an exemplary repudiation process 320. At block 322, the consumer disputes the transaction. At block 324, the issuer obtains a biometric sample from the consumer. The issuer also retrieves the biometric sample used to assign the one-time-use credit card to the consumer at block 326. The issuer is then able to compare the two samples, and the consumer's ability to repudiate the transaction depends on the comparison. This is indicated by block 328.

Hence, according to embodiments of the invention, a consumer is less able to repudiate a transaction, due to the tight coupling between the consumer, using the biometric, and the issuance of the one-time-use number. Of course, the consumer could also claim that the one-time-use number was pilfered after issuance, but other controls may be used to limit such possibility. For example, a consumer may protect himself by requesting the number close in time to the planned usage. The issuer may protect itself by limiting the validity duration of the number to only a few minutes, a few hours, or a few days. The one-time-use nature of the number provides further protection for both the consumer and the issuer by preventing multiple uses of the number. Even further protection may be provided if the merchant takes a biometric sample from the consumer at the time of the purchase transaction. The merchant would then provide the sample to the issuer as part of the authorization process.

Those skilled in the art will appreciate a number of modifications and additional advantages to embodiments of the present invention in light of the disclosure herein. Moreover, in light of the disclosure herein, those skilled in the art will appreciate how the concepts disclosed herein by be applied to other types of transactions. For example, FIGS. 4A and 4B depict an exemplary system 400 and exemplary method 430 for performing money transfer transactions according to embodiments of the present invention.

Figure 4A:
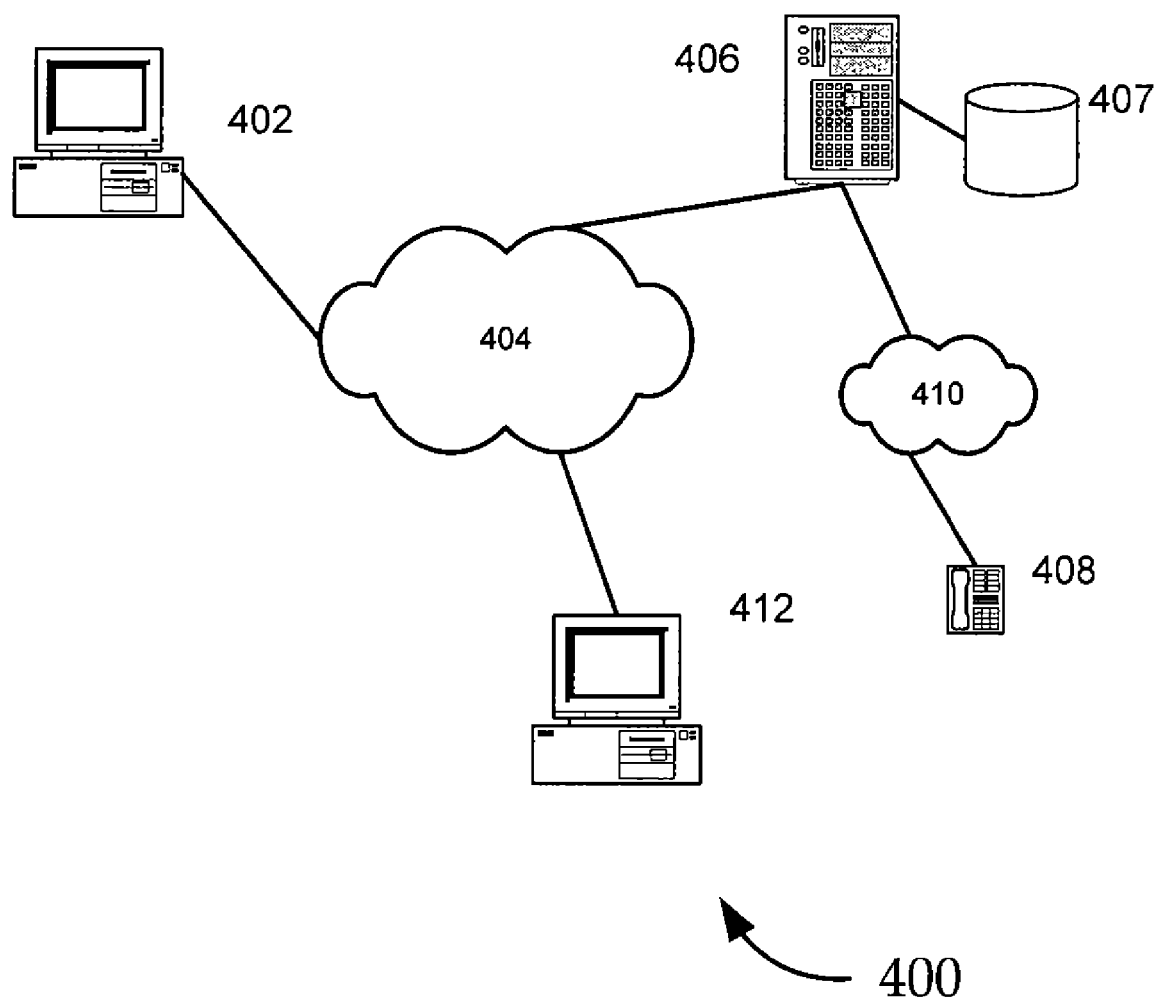
FIG. 4A depicts an exemplary money transfer system according to one embodiment of the invention.
Figure 4B:
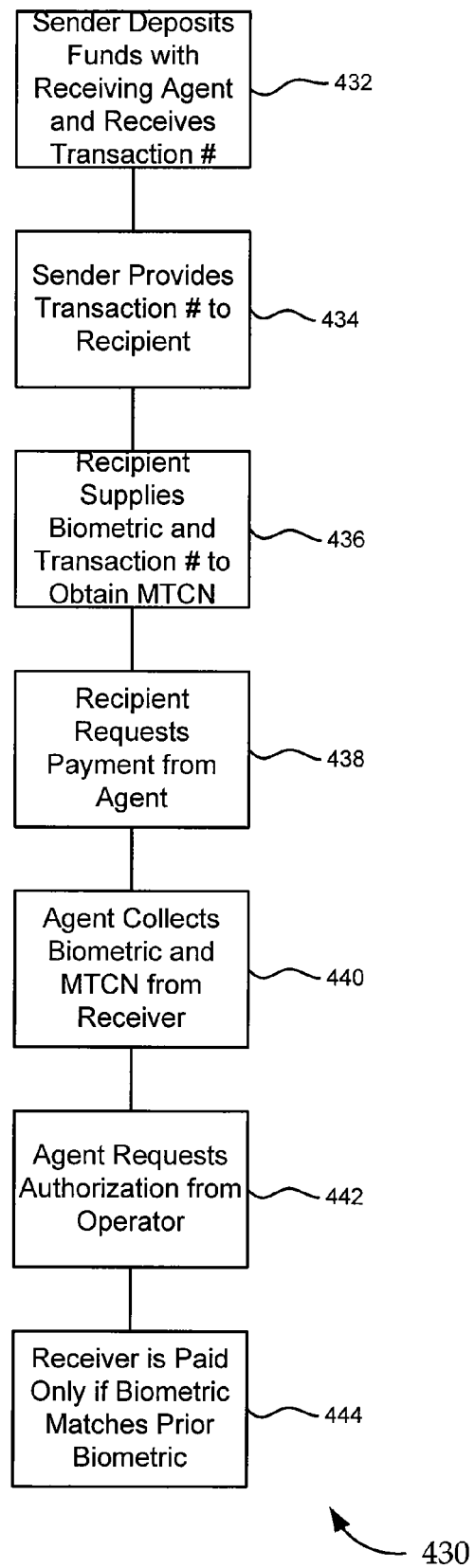
FIG. 4B depicts a money transfer method according to one embodiment of the invention.

Attention is directed to FIG. 4A, which depicts an exemplary money transfer system 400 according to embodiments of the invention. The system 400 includes a sender agent location 402, at which a sender may deposit funds for receipt by a recipient. The sender location 402 may be a computer of the sender or may be a physical agent location (e.g., money transfer office, store, etc.) equipped to initiate money transfer transactions. The sender agent location communicates, via a network 404, with a money transfer system operator 406 to thereby receive a transaction identifier. Typically, a sender might receive a MTCN (Money Transfer Control Number) at this point, but that is not the case here. The sender receives a transaction identifier that cannot be used to obtain the funds like an MTCN could. The transaction identifier is stored at a storage arrangement 407 associated with the money transfer system operator.

The system 400 also includes a telephone 408 associated with a recipient and the PSTN (public switched telephone network) 410 though which the recipient may communicate with the money transfer system operator 406. The recipient, having received the transaction identifier from the sender, is able to provide the transaction identifier and a biometric sample to thereby obtain the MTCN. Those skilled in the art will appreciate many additional means through which the recipient may provide a biometric sample to and obtain a MTCN from the money transfer system operator.

The system also includes a recipient agent location 412 at which the sender may request payment. The sender agent location 412 is able to obtain a biometric sample from the recipient, communicate the biometric sample, along with the MTCN, to the money transfer system operator 406, and receive authorization to pay the recipient. The recipient is paid only if the biometric the recipient provides matches the biometric supplied to obtain the MTCN.

Having described the money transfer system 400, attention is directed to FIG. 4B, which depicts a money transfer method 430 according to embodiments of the invention. The method 430 may be implemented in the system 400 of FIG. 4A or other appropriate system. The method 430 begins at block 432, at which location a sender deposits funds with a money transfer agent and obtains a transaction number. The transaction number is provided by the money transfer system operator. The sender provides the transaction number to the designated recipient at block 434. The recipient contacts the money transfer system operator at block 436 and supplies the transaction identifier and a biometric sample to thereby receive the MTCN. The MTCN is generated by the money transfer system operator according to the embodiments of the invention.

At block 438, the recipient requests payment from a money transfer agent. The agent collects the MTCN and a biometric sample from the recipient at block 440 and supplies them to the operator at block 442 as part of an authorization request. The operator uses the MTCN to locate the biometric sample provided to obtain the MTCN and authorizes the agent to pay the recipient only if the samples match, which takes place at block 444.

Those skilled in the art will appreciate that the aforementioned embodiments are merely exemplary. Moreover, it will be appreciated that the any of a variety of methods may be employed to generate one-time-use credit card numbers, MTCNs, and the like from a biometric sample. In may embodiments, the one-time-use credit card number or MTCN is selected from a large pool of appropriately selected numbers using the biometric sample or a function of a biometric sample, but this is not required. The ensuing description, however, provides exemplary methods for generating a master pool, selecting numbers from the pool, and authorizing transactions using numbers selected from the pool.

Figures 5A, 5B:
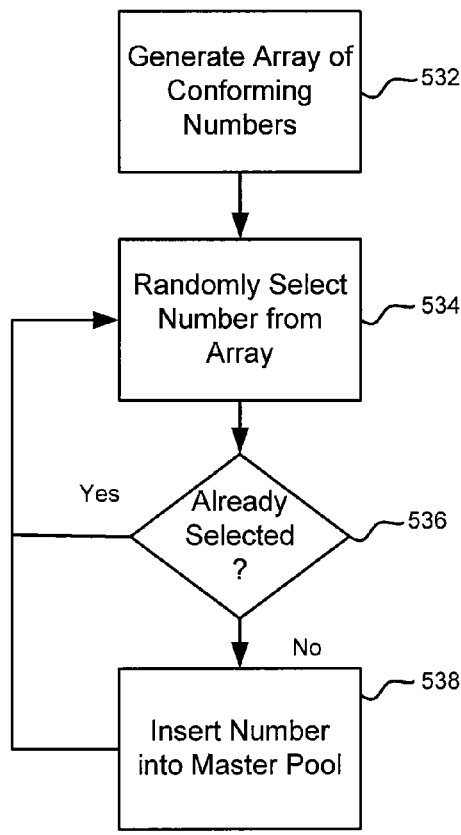
FIG. 5A illustrates an exemplary master pool from which transaction settlement numbers may be selected according to one embodiment of the invention.
FIG. 5B depicts an exemplary method for populating a master pool according to one embodiment of the invention.

Attention is directed to FIG. 5A, which illustrates an exemplary master pool 500 from which transaction settlement numbers may be selected. The transaction settlement numbers may be one-time-use credit card numbers, as in this example, or may be MTCNs, or the like in other embodiments. The master pool 500 includes a "record number" field, a "one-time CC#" field, and an "assignment table pointer" field. The record number field, in this exemplary embodiments, is numbered consecutively throughout the records in the pool, and the pool includes a sufficient number of records to satisfy expected demand for the transaction settlement numbers. The one-time CC# field includes a unique transaction settlement number in each record, and the field of each record is populated randomly as will be described with reference to FIG. 5B. The assignment table pointer field of each record maintains a pointer to a record in an assignment table. The assignment table will be described below with reference to FIG. 8. When a transaction settlement number is assigned, the assignment table pointer field is populated as will be described below with reference to FIG. 9.

FIG. 5B depicts an exemplary method 530 for populating a master pool. At block 532, an array of conforming numbers is generated. The numbers conform to appropriate specification for which the transaction settlement numbers will be used. For example, in this embodiment, the transaction settlement numbers are one-time-use credit card numbers, and the numbers which are sixteen digits long and include no letters. The numbers are in appropriate ranges (e.g., BIN ranges) to thereby prevent duplication with typical credit cards. In other examples, the transaction settlement numbers may be MTCNs, which would be appropriately formatted according to the desired specifications for MTCNs. Many such examples are possible.

At block 534, a first transaction settlement number is randomly selected from the from the array. At block 536 a determination is made whether the transaction settlement number has already been selected. If it has, another transaction settlement number is randomly selected at block 534. If the selected number has not been selected yet, the number is inserted into the master pool at block 538. The process continues, consecutively populating records of the master pool with transaction settlement numbers, until the master pool is fully populated with random selections of transaction settlement numbers from the array. Those skilled in the art will appreciate that this is but one exemplary method for populating an exemplary master pool.

Figures 6A, 6B:
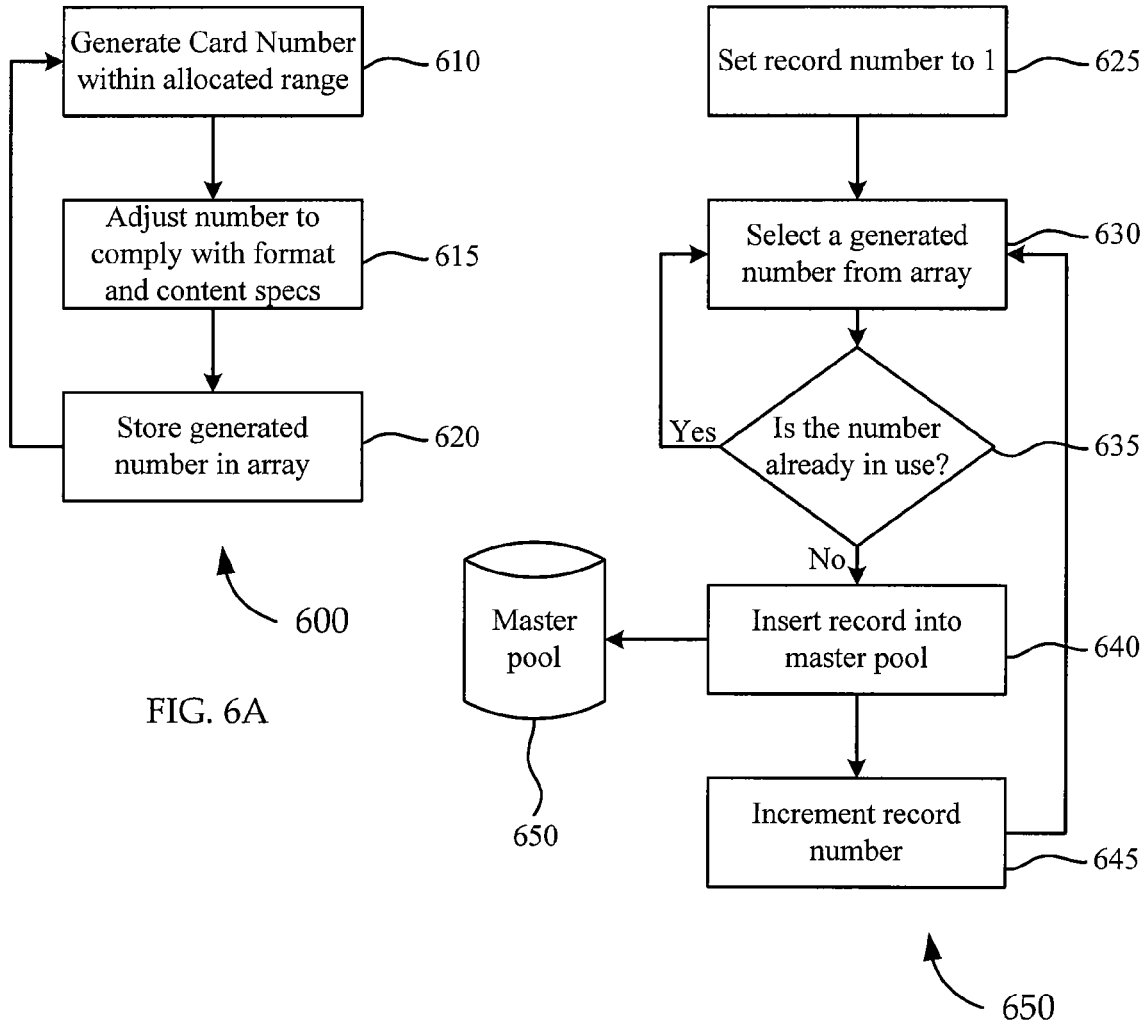
FIG. 6A depicts a method of generating an array of one-time-use credit card numbers according to one embodiment of the invention.
FIG. 6B depicts another method of generating a master pool of one-time-use credit card numbers according to one embodiment of the invention.

FIG. 6A depicts another method 600 for generating an array of one-time-use credit card numbers. In this embodiment, an array of one-time-use credit card numbers is generated. This array is used to assign one-time-use credit card numbers to a user and/or a master pool. At block 610 a one-time-use credit card number is created, which, according to specific embodiments, conforms to appropriate formats and/or standards for which the number will be used (e.g., credit care number, MTCN, etc.). The one-time-use credit card number is adjusted to comply with format and content specifications developed by the industry at block 615. The one-time-use credit card number is then stored in a one-time-use credit card number array at block 620 whereupon the system returns to block 610. Other means for storing the one-time-use credit card number may be used, such as a linked list, a generic file, a text file, etc.

FIG. 6B depicts a method 650 of generating a master pool of one-time-use credit card numbers according to one embodiment of the invention. At block 625 the record number is initiated and set to 1. A one-time-use credit card number is selected from a one-time-use credit card number array at block 630. The array may be the array generated at block 620 of FIG. 6A. This number may be selected randomly, incrementally or systematically. Furthermore, the system may also select the one-time-use credit card number from any other storage location. Once the number is selected, the system, at block 635, determines if it is currently in use or not. If it is currently in use, then the system returns to block 630 and another one-time-use credit card number is selected. The one-time-use credit card number may also be deleted from the one-time-use credit card number array. If the one-time-use credit card number is not in use, the one-time-use credit card number is inserted into the master pool 650 at block 640 at the location associated with the record number. The record number is incremented at block 645 and the system selects another number from the one-time-use credit card number array at block 630 whereupon the system is repeated.

Figure 7:
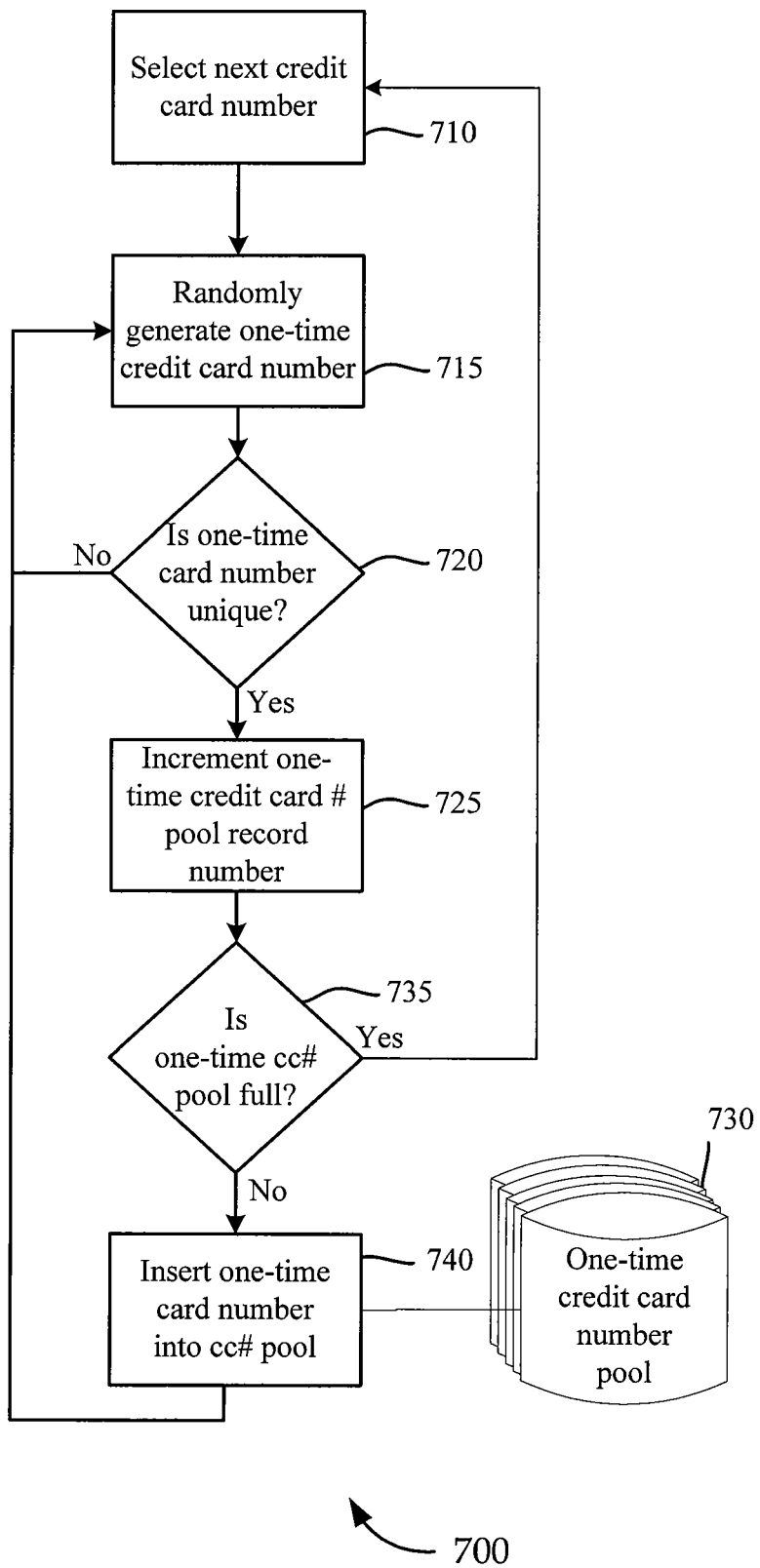
FIG. 7 depicts a method of generating an individual master pool of one-time-use credit card numbers for each credit card number according to one embodiment of the invention.

FIG. 7 depicts a method 700 of generating an individual master pool of one-time-use credit card numbers for each credit card according to one embodiment of the present invention. While this embodiment generates and stores one-time-use credit card numbers in a pool, the method may be used for any type of transaction settlement number. According to this embodiment, each credit card number has an associated pool of one-time-use credit card numbers 730. Each one-time-use credit card number pool 730 may be a fixed size or the size may be adjusted dynamically according to the number of one-time-use credit card numbers used or required by the user.

A credit card number is selected at block 710 for populating the one-time-use credit card number pool 730 associated with the credit card number. A one-time-use credit card number is randomly generated at block 715. Generation of the one-time-use credit card number may also include steps to ensure the one-time-use credit card number complies with industry specifications. At block 720, the method determines if the one-time-use credit card number generated at block 715 is unique, if it is not unique, the method returns to block 715. The system may determine if the one-time-use credit card number is unique by refereeing to a list or array of issued credit card numbers, unissued credit card numbers or the like. If the one-time-use credit card number is unique, the method moves to block 725. At block 725, the one-time-use credit card number pool record number is incremented. At block 735, the system determines if the one-time-use credit card number pool is full. If the pool is full, the system returns to block 710, where another credit card number is selected. In alternative embodiments, the size of the one-time-use credit card number pool 730 may be increased and the system moves along to block 740. In other embodiments, more than one-time-use credit card number pool may be associated with the credit card number. At block 740, the randomly produced one-time-use credit card number is entered into the one-time-use credit card number pool and the system returns to block 715.

Figure 8:
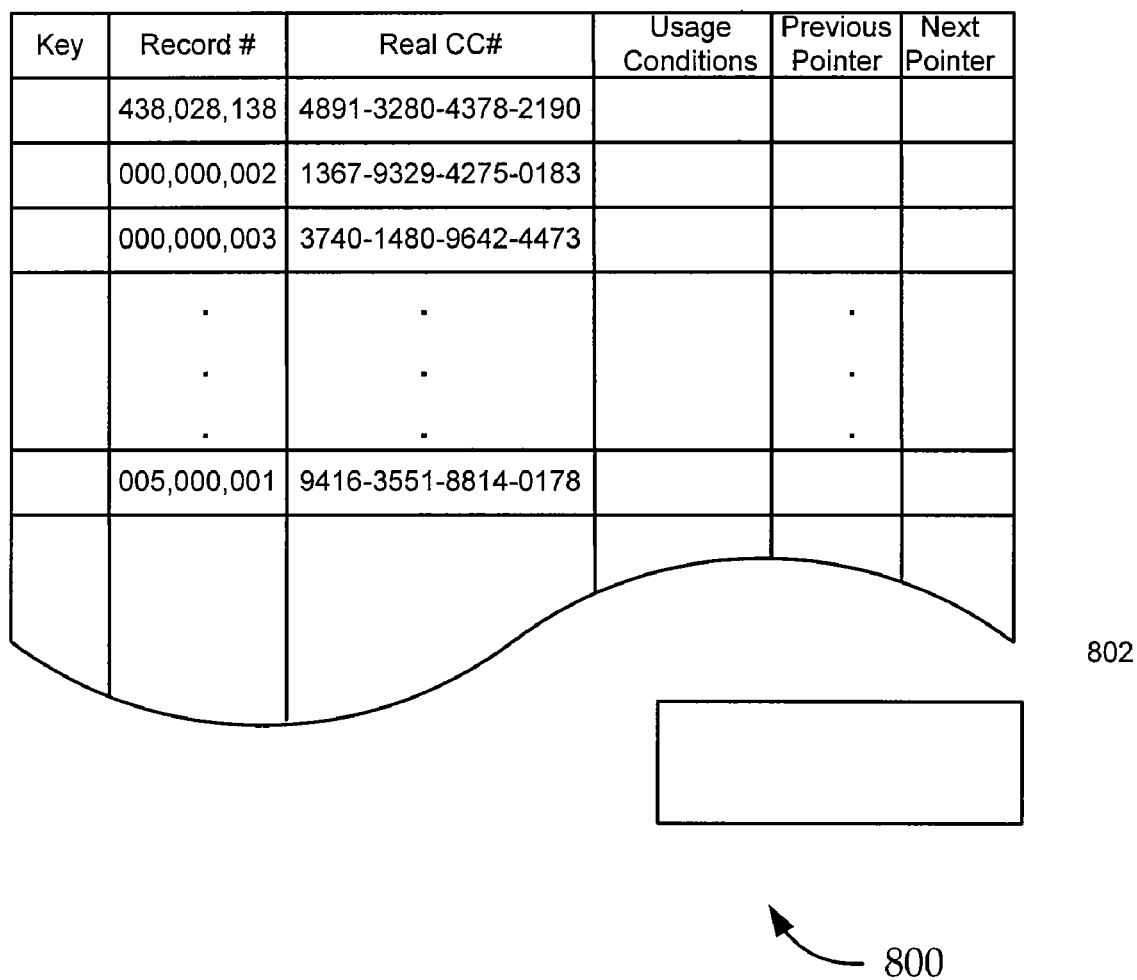
FIG. 8 depicts an assignment table according to embodiments of the present invention.

Attention is directed to FIG. 8, which depicts an assignment table 800 according to embodiments of the present invention. The assignment table 800 maps starting numbers to transaction settlement numbers in the master pool 500. The starting numbers may be, for example, a consumer's credit card account number, as in this example, a transaction identifier provided to a sender in a money transfer transaction, or the like. The assignment table 800 includes a "key" filed, a "record number" field, a "real CC#" field, a "usage conditions" field, a "previous pointer" field, and a "next pointer" field.

The key field provides an index to the assignment table. According to embodiments of the invention, the key field is based on a biometric sample as will be described in greater detail with respect to FIG. 9. The record number field identifies a record in the master pool. The "real CC#" field stores the starting number from which the transaction settlement number is generated. In other exemplary embodiments, the real CC# field may be, for example, the transaction identifier provided to the sender in a money transfer transaction. The usage conditions field may include any of a variety of usage conditions associated with the transaction settlement number. For example, the usage conditions field may identify a limited number of merchants at which the transaction settlement number may be used. It may include an expiration time and/or date for the number, and/or the like. Those skilled in the art will appreciate a number of additional conditions that may be included in the usage number field. The previous and next pointers identify previous and next assignment table records in a daisy chain of records assigned to a common consumer, customer, recipient, or the like, as will be described in greater detail with respect to FIG. 9.

The assignment table 800, unlike the master pool 500, is not fully populated initially. Additional records are added as transaction settlement numbers are requested and assigned by the issuer. A "last record assigned" pointer is used in the process of assigning transaction settlement numbers as will be described with respect to FIG. 9.

Figure 9:
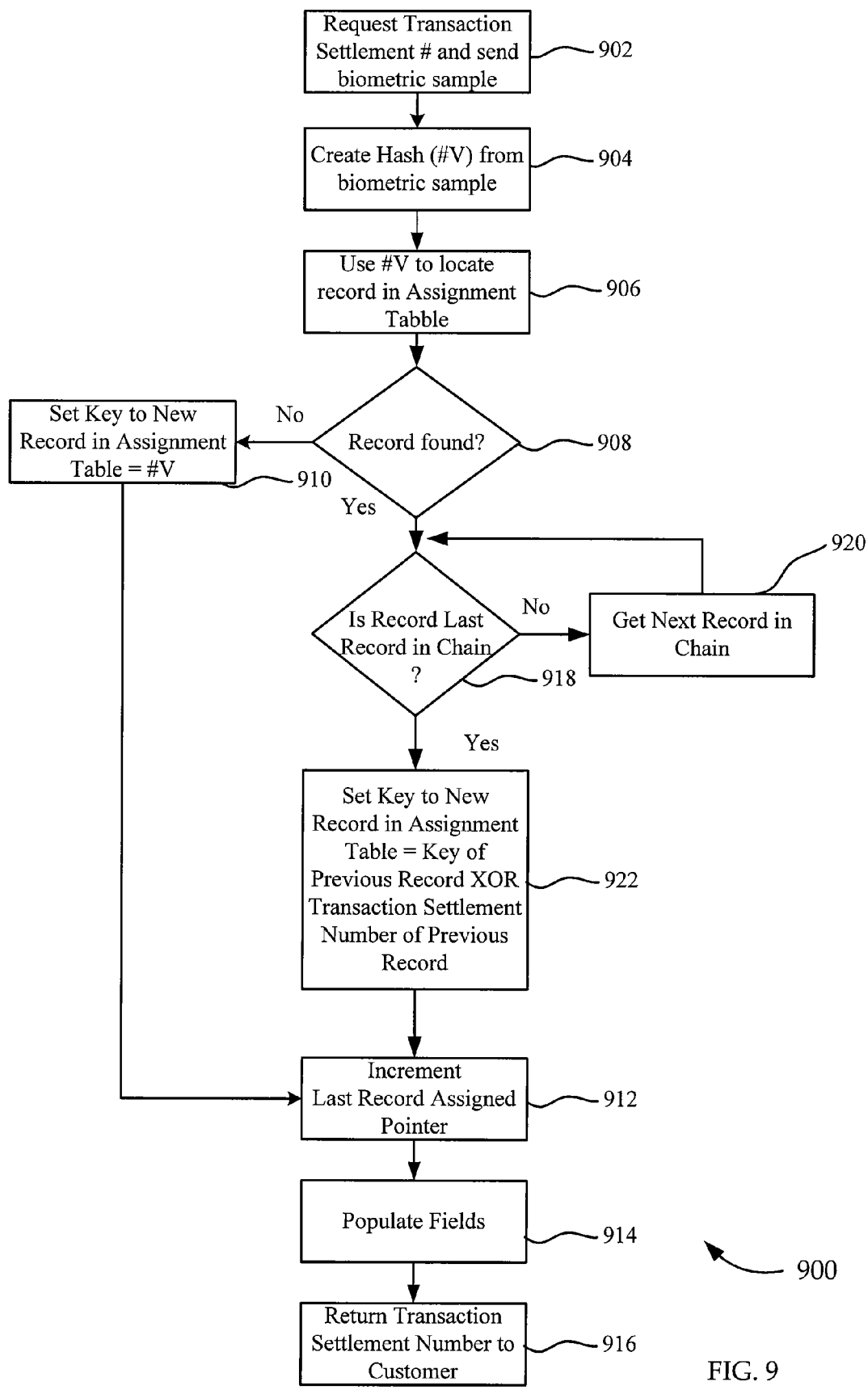
FIG. 9 depicts a method of assigning transaction settlement numbers from the master pool according to embodiments of the present invention.

Attention is directed to FIG. 9, which depicts a method 900 of assigning transaction settlement numbers from the master pool according to embodiments of the present invention. At block 902, a request for a transaction settlement number is received from a customer. In this embodiments, the request is for a one-time-use credit card number and the request is received by an issuer. In other embodiments, the request may be for a MTCN and be received by a money transfer system operator. The request includes a biometric sample (e.g., a voiceprint) from the customer. The request also identifies the customer's credit card account. For example, the customer may have used a USER ID and password to access an account electronically, and the account includes a feature that allows the customer to request a one-time-use credit card number.

At block 904, the issuer creates a hash of the biometric sample, thereby producing #V. In this embodiment, the hashing algorithm produces a #V that is repeatable for different biometric samples of the same individual. In other embodiments, a function other than hashing may be used to produce #V. In other embodiments, the function may not produce a #V that is repeatable for different biometric samples of the same individual.

At block 906, #V is used to search the assignment table. At block 908, a determination is made whether #V has been used previously as an assignment table key. If not, the process continues at block 910. If so, the process continues at block 918 as will be described below.

At block 910, #V is populated into the key field of a new assignment table record. At block 912, the "last record assigned" pointer is incremented to point to the next, unassigned, record in the master pool. At block 914, the record # of the indicated record of the master pool is populated into the record # field of the new record of the assignment table. The customer's real credit card account number is populated into the real CC# field of the new assignment record, the key of the new assignment record is populated into the assignment pointer field of the current master pool record, and any usage conditions are populated into the usage conditions field of the assignment record. The next and previous pointers of the new assignment record are populated appropriately as will be described in greater detail hereinafter.

At block 916, the transaction settlement number is returned to the customer. The customer may thereafter use the transaction settlement number in an appropriate transaction.

Returning to block 910, if #V has been used previously (i.e., a record in the assignment table has the value #V as a key), blocks 912 and 914 are traversed repeatedly until the last assignment table record in the chain is located. Locating the last record in the chain, however, requires knowing how subsequent keys are assigned.

Each time a customer requests a transaction settlement number (e.g., a one-time-use credit card number), a new key is created. The first key is #V. The second key is #V XOR the first transaction settlement number assigned to the customer. Third key is the second key XOR the second transaction settlement number assigned to the customer, and so on.

Hence, each new key incorporates together the customer's biometric and each previously assigned transaction settlement number.

Returning to the discussion of FIG. 9, if a record in the assignment table is located using #V, then the master pool record stored in the assignment table is used to locate the previously assigned transaction settlement number. The next key is then created by performing an XOR function of #V and the previously assigned transaction settlement number. This key is used to search the assignment table, and if a record is located, the next key in the sequence is created and the table is searched again. This process continues until a search of the assignment table does not return a record. The current key then becomes the key of the new record in the assignment table created at block 922.

It should now be apparent to those skilled in the art that the next and previous pointer fields may be, at block 914, populated to assist with searches of the assignment table. This will be particularly useful during authorization and dispute resolution processes as will be described in greater detail hereinafter with reference to FIGS. 10 and 11.

Figure 10:
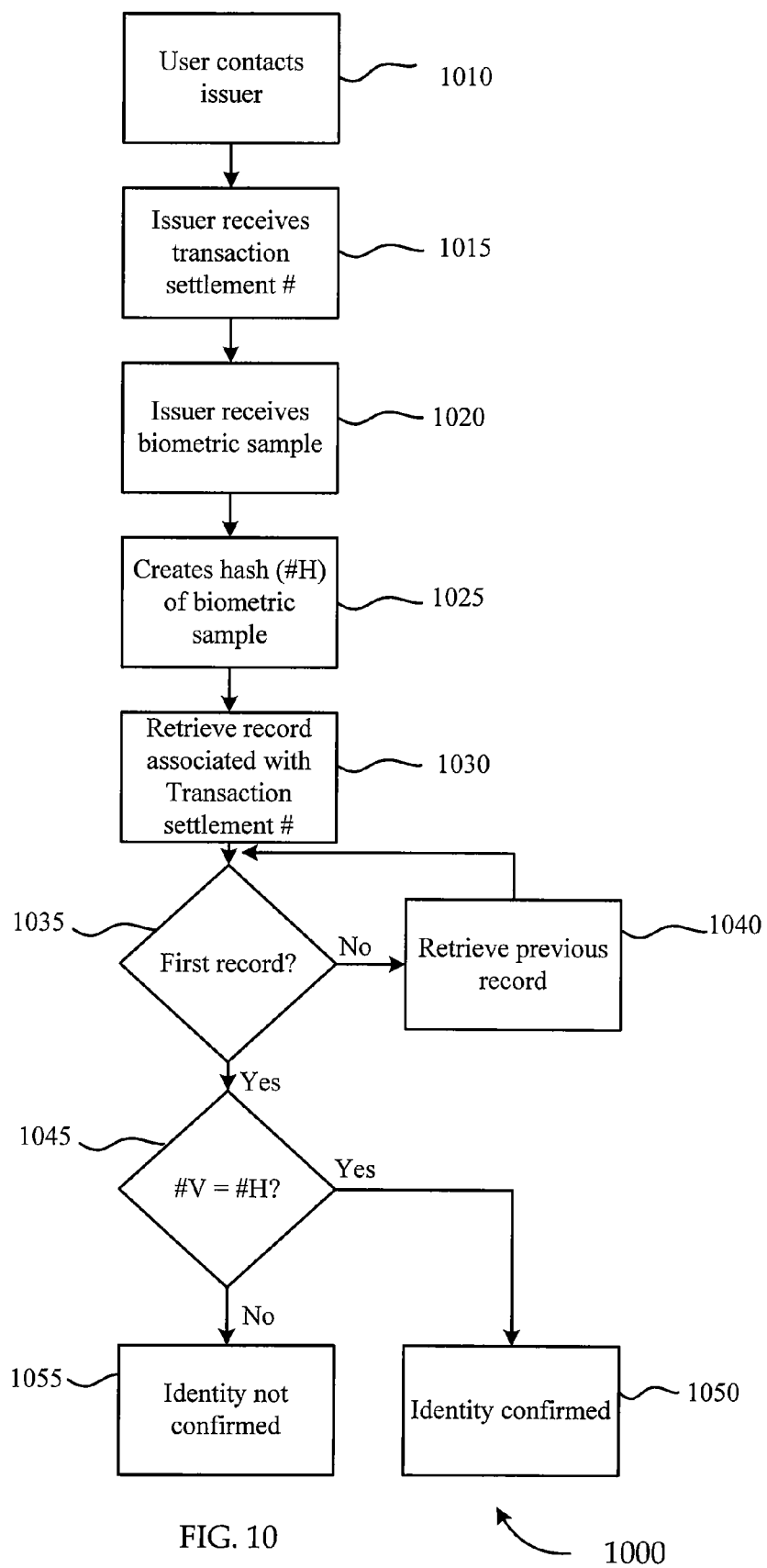
FIG. 10 depicts a method of confirming the identity of user associated with a transaction settlement identifier according to one embodiment of the invention.

FIG. 10 shows a method 1000 for confirming the identity of a user by comparing a received biometric sample and the stored sample to detect for fraudulent transactions according to one embodiment of the invention. The method 1000 shown may be used for any type of transaction settlement identifier, such as, for example, one-time-use credit card numbers and/or MTCN's. In light of the embodiment described in the figure, those skilled in the art will recognize other embodiments well within the scope of the invention.

At Block 1010 a user contacts issuer to dispute a transaction they consider to be fraudulent. The user's identity may need confirmation because the user may deny requesting and having been issued a one-time-use credit card number and, therefore, deny making a transaction with the one-time-use credit card number. The user may also wish to confirm their identity in order to receive a payout.

At block 1015, the issuer receives the transaction settlement number from the user as well as a biometric sample at block 1020. After receiving the biometric feature, the issuer creates a hash (#H) of the biometric sample at block 1025 using a hashing algorithm as discussed above. The issuer may then retrieve the record associated with the transaction settlement number at block 1030, for example, from the assignment table.

The record retrieved at block 1030, may contain the transaction settlement number, and a unique key. The record may also contain previous and next pointers. The previous and next pointers link the records for a particular user in a chain like fashion. As described above, the key associated with each transaction settlement number may be a mathematical combination of the previous key and the previous transaction settlement number. The first key associated with a user is the hash of the biometric sample. Thus, at block 1035, the method determines whether this record associated with the transaction settlement number is the first record in the chain. If the previous pointer is NULL, then the record is the first record in the chin. If it is not the first record the method retrieves the previous record at block 1040. If the previous pointer equals NULL then the record is the first record. Between blocks 1035 and 1040, the method traverses the chain of records to find the first record. Once the first record is found the stored hash of the biometric sample (#V) is the key associated with the first record. At block 1045, the method determines whether the received biometric sample hash (#H) equals the stored hash of the stored biometric sample (#V). If the two hashed samples match, the identity of the user is confirmed at block 1050. If the two hashed samples do not match, the identity of the user is not confirmed.

The method 1000, for example, may be applicable in a system generating one-time-use credit card numbers, where a one-time-use credit card number is the transaction settlement number. In such systems, a user receives a one-time-use credit card number upon receipt of a biometric sample. If a user claims that they did not request a one-time-use credit card number, the biometric sample received from the user and stored when the one-time-use credit card number was issued may be used to either confirm or deny the users claim. For example, the user contacts the issuer at block 1010, the credit card number is received 1015, and a biometric sample is received 1020. The stored biometric sample used when the one-time-use credit card number was issued is retrieved in blocks 1030, 1035 and 1040 and the chain of records may be traversed. The biometric samples are compared. If the hash of the biometric sample received when the one-time-use credit card number was issued matches the hash of the biometric sample received at block 1020, then the user's claim is denied, because the one-time-use credit card number was issued to the user and not a fraudster. Otherwise, if there is no match, the user may have a genuine fraud claim, whereupon the issuers may initiate procedures to address the fraudulent activity.

Figure 11:
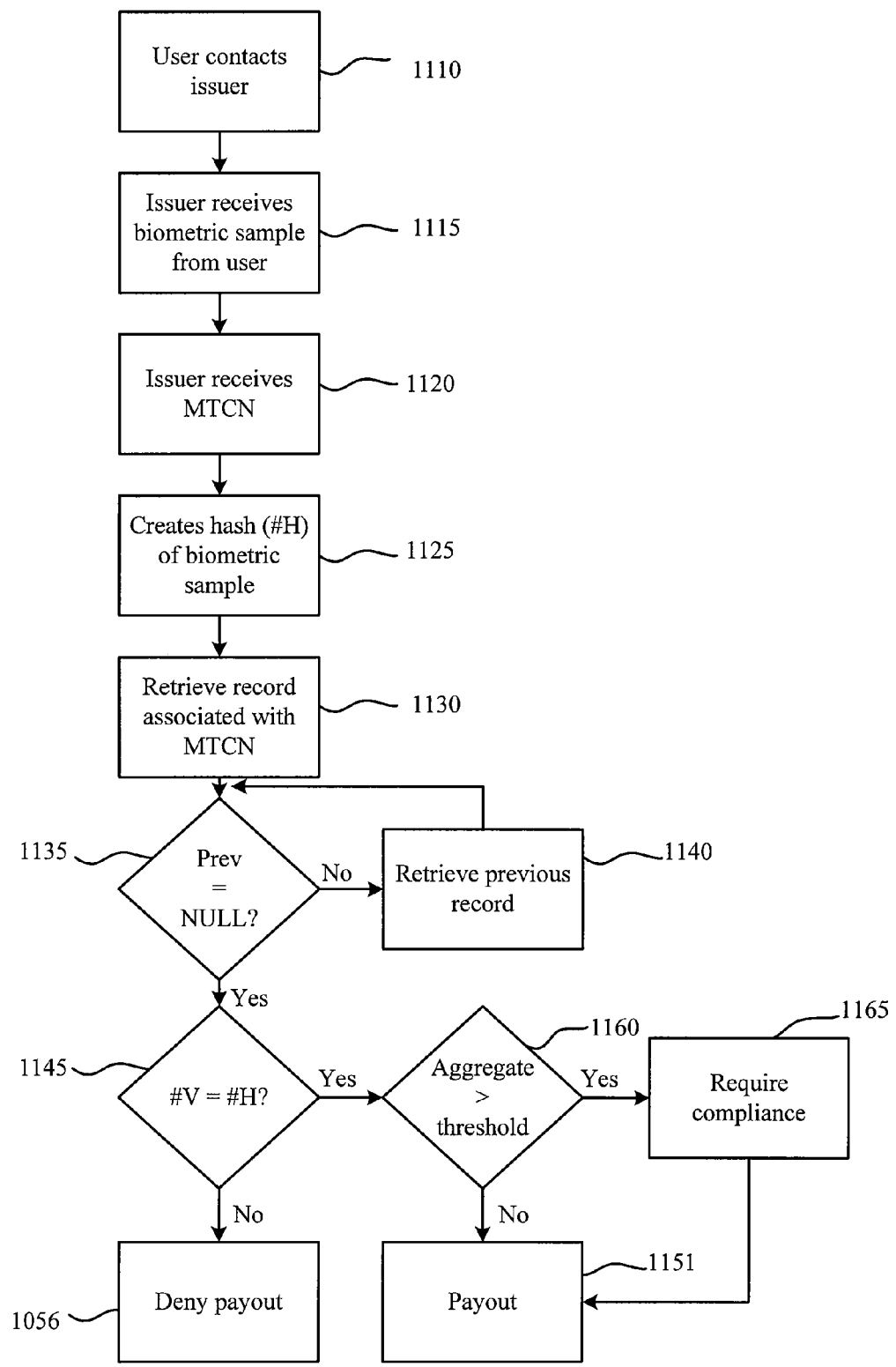
FIG. 11 depicts a method of confirming the identity of payee associated with a MTCN according to one embodiment of the invention.

FIG. 11 shows a method 1100 for confirming the identity of a user in a money transfer transaction according to one embodiment of the invention. In such transactions, in order to avoid fraudsters, a payout may only be received by first confirming the identity of the payee. Blocks 1110, 1115, 1120, 1125, 1130, 1135, 1140 and 1145 are similar to blocks 1010, 1015, 1020, 1025, 1030, 1035, 1040 and 1045 of FIG. 10, except in this method 1100 the transaction settlement identifier is a MTCN. At block 1145, if the hash of the received biometric sample does not match the hash of the stored biometric sample, then the payout is denied. If the two hashes match, then the method determines whether the aggregate payout to the user is greater than some predetermined threshold at block 1160. Legally, money transfers greater than a certain amount, must meet certain compliance requirements to deter money laundering. The aggregate payout may be determined by moving through the daisy chain of records and summing the payout of all transaction. If the aggregate payout is greater than the threshold then compliance requirements must be satisfied at block 1165 before payout occurs at block 1151. Those skilled in the art will recognize how to implement various compliance procedures. If the aggregate payout is not greater than the threshold then payout at block 1151 may occur.

Figure 12:
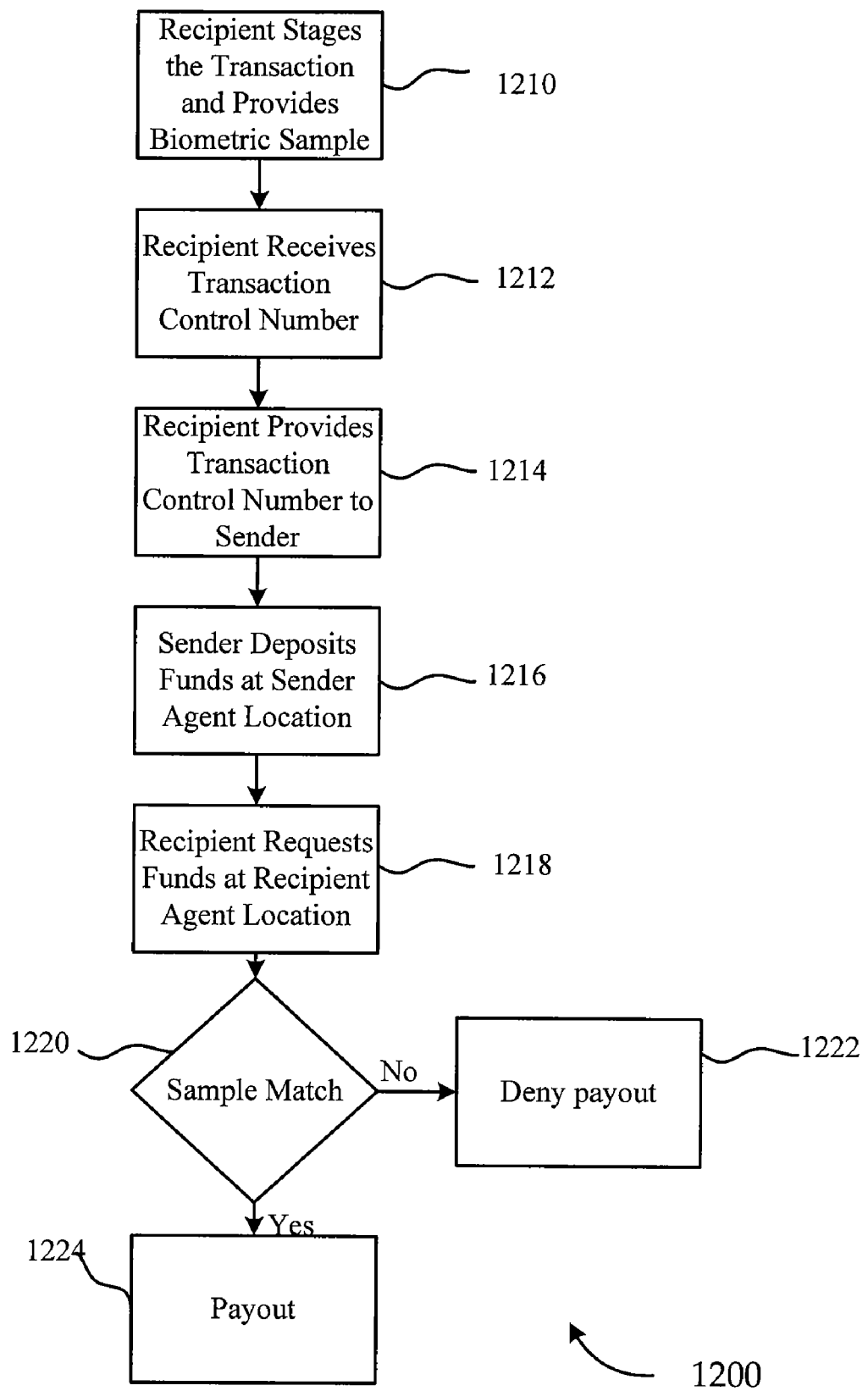
FIG. 12 depicts a first exemplary method of a recipient-staged money transfer transaction.
Figure 13:
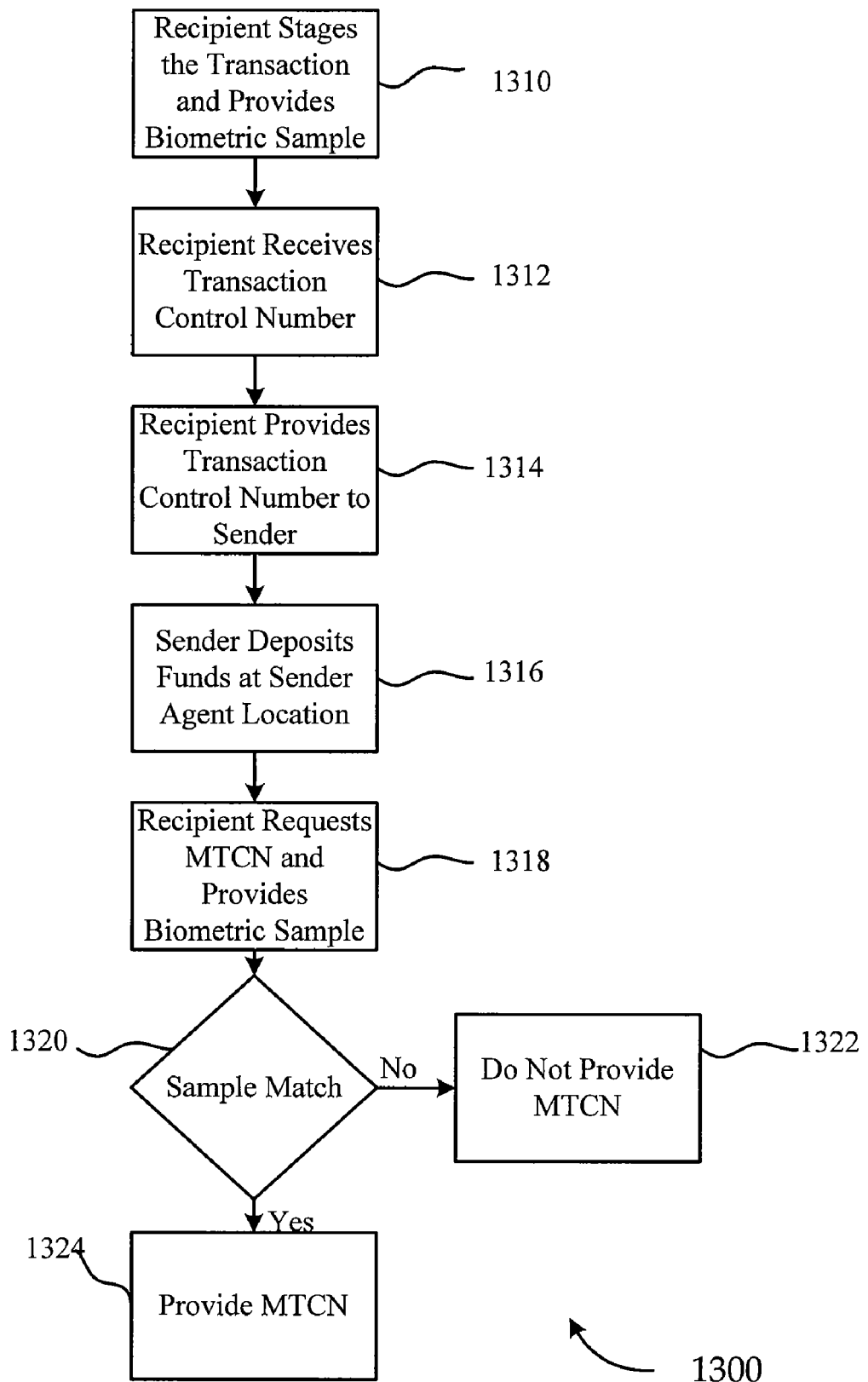
FIG. 13 depicts a second exemplary method of a recipient-staged money transfer transaction.

Attention is directed to FIGS. 12 and 13, which depict exemplary embodiments of recipient-staged money transfer transaction. In these embodiments, a recipient "stages" a transaction by providing a biometric sample and receiving a transaction control number. The recipient also may provide other transaction details, but this is not necessary. The recipient provides the transaction control number to a sender, who then deposits funds using the transaction control number. The funds can then be released only upon the recipient providing a confirming biometric sample. The embodiments 1200 and 1300 provide two different ways in which this can be accomplished.

According to the embodiment 1200 of FIG. 12, a recipient stages a transaction at block 1210. This includes providing a biometric sample. The recipient may stage the transaction using a phone and providing a voice sample, visiting a money transfer location and providing another type of biometric sample, or using any of a variety of other ways apparent to those skilled in the art in light of this disclosure. The sample or a derivative thereof is stored in a transaction record, and the recipient is provided with a transaction control number at block 1212, which the recipient provides to a sender at block 1214.

At block 1216, the sender deposits funds and provides any additional details necessary to create the transaction. The transaction record established by the recipient is accessed using the transaction control number provided to the sender by the recipient. At this point, the ability to receive the funds is closely tied to the recipient via the biometric sample. The blocks 1210, 1212, 1214, and 1216 are substantially similar to the corresponding blocks 1310, 1312, 1314, and 1316 of the embodiment 1300 of FIG. 13.

The recipient can now receive the funds in any of several ways. According to the embodiment 1200 of FIG. 12, the recipient requests funds at a money transfer location and provides a biometric sample at block 1218. A determination is made at block 1220 whether the sample matches the sample provide at the time the transaction was staged. If is does not, then payout is denied at block 1222. If the sample matches, the payout is made at block 1224.

According to the exemplary embodiment 1300 of FIG. 13, a recipient is able to receive the funds electronically or at a money transfer location this is not equipped to take a biometric sample. At block 1318, the recipient requests a MTCN by providing a biometric sample. The recipient can request the biometric sample by, for example, phoning the money transfer system operator. At block 1320, a decision is made whether the sample matches the sample obtained at the time the transaction was staged. If is does not, the MTCN is not provided to the recipient, as indicated by block 1322. If, however, the samples match, the a MTCN is provided to the recipient at block 1324.

Thereafter, the recipient may use the MTCN to access the funds in any of a variety of ways, including by visiting a money transfer location, accessing an account electronically, and the like, as is apparent to those skilled in the art in light of this disclosure.

Having described several embodiments, it will be recognized by those of skill in the art that various modifications, alternative constructions, and equivalents may be used without departing from the spirit and scope of the invention. Additionally, a number of well known processes and elements have not been described in order to avoid unnecessarily obscuring the present invention. For example, those skilled in the art know how MTCNs are used in money transfer transactions and how one-time-use credit card purchase transactions are settled. Moreover, those skilled in the art will appreciate that the concepts discussed herein may be directed toward other types of transactions. Accordingly, the above description should not be taken as limiting the scope of the invention, which is defined in the following claims.

What is claimed is:

1. A money transfer system, comprising:
    an input adapted to receive biometric samples;
    a storage arrangement configured to store the biometric samples or derivatives thereof; and
    a processor, wherein the processor is configured to execute instructions comprising instructions to:
        create a hash using a first biometric sample;
        use the hash to select an MTCN (money transfer control number) from a pool of predetermined MTCNs; and
        link the hash to the MTCN.

2. The system of claim 1, wherein the biometric sample comprises a selection from the group consisting of: a voiceprint, a fingerprint, a retinal scan, and a DNA sample.

3. The system of claim 1, wherein the processor further comprises instructions to respond to a request to settle a transaction using the MTCN by receiving a second biometric sample and comparing the second biometric sample to the first biometric sample.

4. The system of claim 1, wherein the processor further comprises instructions to determine whether to provide funds to a recipient by determining whether the funds have been paid out.

5. The system of claim 1, wherein the processor further comprises instructions to determine whether to provide the funds to the recipient by determining whether an amount of the funds exceeds a threshold amount of funds transferred for which compliance is required.

6. A computerized method of transferring funds from a sender to a recipient, comprising:
    receiving, by a computer system, a request to transfer the funds from the sender;
    creating, by the computer system, a transaction record having a transaction identifier;
    providing, by the computer system, the transaction identifier to the sender;
    receiving, by the computer system, the transaction identifier from a recipient;
    obtaining, by the computer system, a first biometric sample from the recipient;
    creating, by computer system, a first hash using the first biometric sample from the recipient;
    using, by the computer system, the first hash to select an MTCN (Money Transfer Control Number) from a pool of predetermined MTCNs;
    associating, by the computer system, the MTCN with the first hash and the transaction record;
    providing, by the computer system, the MTCN to the recipient;
    thereafter, receiving, by the computer system, a request from the recipient to receive the funds;
    obtaining, by the computer system, the MTCN from the recipient;
    obtaining, by the computer system, a second biometric sample from the recipient;
    using, by the computer system, the MTCN and/or the second biometric sample to locate the transaction record;
    creating, by computer system, a second hash using the second biometric sample from the recipient;
    comparing, by the computer system, the second hash to the first hash; and
    determining, by the computer system, whether to provide the funds based on the comparison.

7. The method of claim 6, wherein determining whether to provide the funds based on the comparison comprises determining whether the funds have been paid out.

8. The method of claim 6, wherein determining whether to provide the funds based on the comparison comprises determining whether an amount of the funds exceeds a threshold amount of funds transferred for which compliance is required.

9. The method of claim 6, wherein the each biometric sample comprises a selection from the group consisting of: a voiceprint, a fingerprint, a retinal scan, and a DNA sample.

10. A computerized method of transferring funds from a sender to a recipient, comprising:
    receiving, by a computer system, a request from the recipient to stage the transaction;
    obtaining, by the computer system, a first biometric sample from the recipient;

creating, by the computer system, a first hash using the first biometric sample;

using, by the computer system, the first hash to select a transaction number from a pool of predetermined transaction numbers;

creating, by the computer system, a transaction record having the transaction number and the first hash associated therewith;

providing, by the computer system, the transaction number to the recipient;

receiving, by the computer system, a request from the sender to deposit the funds;

receiving, by the computer system, the transaction number from the sender;

modifying, by the computer system, the transaction record to indicate that the funds have been deposited;

thereafter, receiving, by the computer system, a request from the recipient to receive the funds; and using, by the computer system, a second biometric sample, at least in part, to determine whether to provide the funds to the recipient.

11. The method of claim 10, wherein using a second biometric sample, at least in part, to determine whether to provide the funds to the recipient comprises:

receiving the transaction number from the recipient;

obtaining the second biometric sample from the recipient;

using the transaction number and/or the second biometric sample to locate the transaction record;

comparing the first biometric sample to the second biometric sample; and based on the comparison, determining whether to issue an MTCN (Money Transfer Control Number).

12. The method of claim 11, comprising:

thereafter, receiving the MTCN at a money transfer location; and providing the funds to the recipient.

13. The method of claim 11, wherein determining whether to issue an MTCN comprises determining whether the funds have been paid out.

14. The method of claim 10, wherein determining whether to issue an MTCN comprises determining whether an amount of the funds exceeds a threshold amount of funds transferred for which compliance is required.

15. The method of claim 10, wherein using a second biometric sample, at least in part, to determine whether to provide the funds to the recipient comprises:

at a money transfer location, receiving a request to receive the funds from the recipient;

receiving the transaction number from the recipient;

using the transaction number to locate the transaction record;

obtaining the second biometric sample from the recipient; and comparing the first biometric sample to the second biometric sample.

16. The method of claim 10, wherein using a second biometric sample, at least in part, to determine whether to provide the funds to the recipient comprises determining whether the funds have been paid out.

17. The method of claim 10, wherein using a second biometric sample, at least in part, to determine whether to provide the funds to the recipient comprises determining whether an amount of the funds exceeds a threshold amount of funds transferred for which compliance is required.

18. The method of claim 10, wherein the biometric sample comprises a selection from the group consisting of: a voiceprint, a fingerprint, a retinal scan, and a DNA sample.

* * * * *